United States Patent [19]

Ishioka et al.

[11] Patent Number: 6,027,701
[45] Date of Patent: Feb. 22, 2000

[54] OZONE GENERATOR

[75] Inventors: Hisamichi Ishioka; Makoto Toraguchi; Takaya Nishikawa; Hideaki Nishii, all of Kawasaki, Japan

[73] Assignee: Fuji Electric Co., Ltd., Kawasaki, Japan

[21] Appl. No.: 08/863,949

[22] Filed: May 27, 1997

[30] Foreign Application Priority Data

May 30, 1996 [JP] Japan ..................................... 8-135608

[51] Int. Cl.[7] ............................ B01J 19/08; C01B 13/10
[52] U.S. Cl. ...................................... 422/186.19; 204/176
[58] Field of Search ....................... 204/176; 422/186.19, 422/186.2, 186.22

[56] References Cited

U.S. PATENT DOCUMENTS

| | | | |
|---|---|---|---|
| 3,766,051 | 10/1973 | Bollyky | 422/186.19 |
| 3,899,685 | 8/1975 | Francis et al. | 422/186.16 |
| 4,232,229 | 11/1980 | Tanaka et al. | 422/186.2 |
| 4,693,870 | 9/1987 | Gloor et al. | 422/186.19 |
| 4,877,588 | 10/1989 | Ditzler et al. | 422/186.19 |
| 5,002,739 | 3/1991 | Ditzler et al. | 422/186.19 |
| 5,034,198 | 7/1991 | Kaiga et al. | 422/186.07 |
| 5,258,165 | 11/1993 | Olsen | 422/186.18 |
| 5,702,673 | 12/1997 | Kaji et al. | 422/186.07 |

FOREIGN PATENT DOCUMENTS 2-184506  7/1990  Japan .

*Primary Examiner*—Jill Warden
*Assistant Examiner*—Alex Noguerda
*Attorney, Agent, or Firm*—Venable; Robert J. Frank; Catherine M. Voorhees

[57] ABSTRACT

An ozone generator includes a vessel provided at one end with a feed gas chamber for receiving a feed gas through an inlet and at the other end with an ozonized gas chamber, communicating with an outlet, for receiving an ozonized gas, a cylindrical tube ground electrode having a dielectric on an inner peripheral surface for communicating the feed gas chamber with ozonized gas chamber, a hollow cylindrical high voltage electrode having a predetermined discharge gap with respect to the dielectric and disposed concentrically with the cylindrical tube ground electrode, and a high frequency power source for applying a voltage between the ground electrode and the high voltage electrode. Cooling water is supplied to a water jacket surrounding the ground electrode and formed within the vessel and to the hollow cylindrical high voltage electrode to cool both electrodes. The cylindrical tube ground electrode and the hollow cylindrical high voltage electrode define an ozone generating tube, and the ozone generator incorporates a plurality of the ozone generating tubes.

26 Claims, 32 Drawing Sheets

OZONE GENERATOR

BACKGROUND OF THE INVENTION

1. Field of the Invention

The present invention relates to an ozone generator for use in an industrial field requiring a large amount of ozone such as drinking water and sewage treatment, pulp bleaching, and the like.

2. Description of Related Art

As an industrial scale ozone generator described above, an ozone generator for ozonizing an oxygen-containing feed gas by using silent discharge is known to the public in Japanese Patent Application Laid-open No. 2-184506 (U.S. Pat. No. 5,034,198) and the disclosure of this patent is incorporated by reference in the present specification.

Construction of the above-described conventional ozone generator is shown in FIGS. 25 to 27. In FIGS. 25A and 25B, a vessel of the ozone generator basically comprises a cylindrical body 1 made of stainless steel or the like which is highly corrosion resistant to ozone, end plates 2 and 3 for closing both end openings of the body 1, and a pair of circular partition walls 5 and 6 disposed with a space to form a water jacket 4 surrounding a ground electrode which will be described later at the center in the body. In the periphery of the body 1, a feed gas inlet 7 is provided between the end plate 2 and the partition wall 5, an ozonized gas outlet 8 is provided between the other end plate 3 and the partition wall 6, and a cooling water inlet 9 for supplying cooling water from the outside through the water jacket 4 formed between the partition walls 5 and 6 and a cooling water outlet 10 are provided.

Further, inside the body 1, there are provided a plurality of sets of ozone generating tubes each set consisting of a tubular cylindrical ground electrode 11 made of ozone resistant stainless steel and a high voltage electrode 13 concentrically disposed with respect to the ground electrode 11 so as to form a discharge gap there between, the plurality of sets of ozone generating tubes extending over between the partition walls 5 and 6 and horizontally disposed penetrating the partition walls. The high voltage electrode 13 is connected to a high voltage terminal of a high frequency power source 16 by a bus bar 14 arranged inside the body 1 through a bushing 15 provided in the body 1. Further, the ground side of the high frequency power source 16 is grounded together with the body 1.

Still further, connections between the body 1 and the partition walls 5 and 6, and those between the partition walls 5 and 6 and the ground electrode 11 penetrating the partition walls are liquid-tight seam welded to form an integral construction. The end plates 2 and 3 are retained on the opposite ends of the body 1 with screws or the like through an air-tight sealing member 17 such as a flat plate-formed gasket or an O-ring.

Next, a detailed structure of the conventional ozone generating tube is shown in FIGS. 26A and 26B. Specifically, the high voltage electrode 13 concentrically disposed in the cylindrical tube ground electrode 11 comprises a round-sectioned glass tube 13a with one end portion closed and a metal film 13b formed by sputtering on the inner peripheral surface of the glass tube 13a, thereby forming a nearly uniform discharge gap 12 over the entire length of the electrode. Further, the bus bar 14 leading into the chamber and the metal film 13b are connected through a conductive contactor 13c. Cooling water flowing into the water jacket 4 uses ordinary water and is recirculated via an external recirculation pump and a cooling heat exchanger (both not shown).

With the above-described arrangement, the oxygen-containing feed gas (oxygen or air, previously demoistured and introduced into a gas chamber) supplied to a feed gas chamber from the gas inlet 7 flows in the discharge gap 12 along the ozone generating tubes incorporated in the body. In this state, when AC voltage is applied between the ground electrode 11 and the high voltage electrode 13 from the high frequency power source 16, oxygen in the feed gas is ozonized by silent discharge produced in the discharge gap, an ozonized gas flows out to an ozonized gas chamber in the body, and is then fed to an ozone user through the gas outlet. Heat evolved in association with the ozone production (ozone generation reaction is an exothermic reaction) is transmitted to the cooling water flowing in the water jacket 4 and removed out from the system. The gas outlet 8 is provided with an exhaust valve (not shown) for gas pressure adjustment, thereby adjusting the inner pressure of the gas chamber to a positive pressure relative to the atmospheric pressure. In an actual product, one unit of ozone generator incorporates several tens to several hundreds of ozone generating tubes disposed in parallel.

FIG. 27 is a schematic illustration showing a layout of a main unit, a power source, and cooling system accessory devices in a prior art ozone generator, in which the main unit (vessel) 18 of the ozone generator is connected with external cooling water piping 19 as a cooling water supply means, and cooling water recirculates via a recirculation pump 20 and a water-cooled heat exchanger 21. Furthermore, a high frequency power source 16 comprises a combination of an inverter 16a for converting commercial power into high frequency power with a step-up transformer 16b and is connected to supply power to the main unit 18 through a high voltage cable 22.

However, the above-described prior art ozone generator has problems as will be described below.

1) When, with the aim of enhancing the concentration of ozone produced, power density (discharge power per unit discharge area) supplied to the discharge electrodes is increased, charged particles in the plasma collide with the electrodes to heat the electrodes, decomposing the produced ozone (the decomposition reaction of ozone is an endothermic reaction, and decomposition is thus accelerated as the temperature increases). Therefore, the electrode portion must be cooled efficiently even further. However, in the prior art electrode cooling structure, only the ground electrode is cooled from the outer peripheral surface side by flowing water in the water jacket, but the high voltage electrode opposing across the discharge gap is not directly water-cooled.

On the other hand, considering heat evolution at the discharge gap between electrodes, since a creeping streamer is formed on the surface of the dielectric (glass tube) in association with silent discharge, a substantial amount of heat evolution occurs on the surface of the dielectric in addition to the heat evolution at the discharge gap.

Therefore, since, with the prior art electrode cooling structure, the discharge gap acts as a kind of heat insulation layer, heat evolved on the high voltage electrode side cannot be efficiently removed, resulting in reduced ozone generation efficiency and concentration of ozone produced.

2) To improve the ozone generation efficiency, it is important that a discharge gap is uniformly formed which is optimum for maintaining stable silent discharge between the ground electrode and the high voltage electrode. However, since in the prior art structure, the glass tube as a dielectric is inserted directly into the tube of the ground electrode, uniformity of the discharge gap along the longitudinal direction is limited by dimensional precision of the glass tube, and it has been very difficult to set the discharge gap equal to or less than 2 mm in an actual product.

3) Since, in the prior art structure, the ground electrode is integrally welded to the partition walls of the gas chamber, it is very difficult to inspect and replace the ground electrode.

4) Furthermore, since the glass tube as a dielectric is disposed outside the high voltage electrode, there is a danger of damaging the glass tube by hitting against other structures when the high voltage electrode is removed for maintenance or inspection. Still further, the metal film (electrode portion) sputtered onto the inner surface of the glass tube tends to peel during repetitions of heat cycle of operation and stop of the ozone generator due to a difference in thermal expansion coefficient between the glass tube and the metal film.

SUMMARY OF THE INVENTION

It is a primary object of the present invention to provide an ozone generator which is high in cooling capacity of electrodes, simple in construction, and capable of efficiently producing ozone of high concentration. It is another object of the present invention to provide an ozone generator, in which the ozone generating tube is adapted to be simply removed, and which is superior in performance, reliability and maintainability.

There is provided an ozone generator comprising:

a vessel provided at one end with a feed gas chamber for receiving a feed gas through an inlet and at the other end with an ozonized gas chamber, communicating with an outlet, for receiving an ozonized gas;

a cylindrical tube ground electrode having a dielectric on an inner peripheral surface thereof for communicating the feed gas chamber with the ozonized gas chamber;

a hollow cylindrical high voltage electrode having a predetermined discharge gap with respect to the dielectric and disposed concentrically with the cylindrical tube ground electrode;

a high frequency power source for applying a voltage between the ground electrode and the high voltage electrode; and cooling water supply means for supplying cooling water to a water jacket surrounding the ground electrode and formed within the vessel and to the hollow cylindrical high voltage electrode;

wherein the cylindrical tube ground electrode and the hollow cylindrical high voltage electrode define an ozone generating tube and the ozone generator comprising a plurality of the ozone generating tubes.

Here, the cooling water may be pure water having a specific resistivity value of equal to or higher than 200 kΩcm.

A flow rate of the cooling water flowing in the hollow cylindrical high voltage electrode may be set equal to or more than 20 cm/sec.

The hollow cylindrical high voltage electrode may have bending precision per 1 m of electrode length set equal to or less than 0.2 mm and circularity set equal to or less than ±0.1 mm, the cylindrical tube ground electrode may have bending precision per 1 m of electrode length set equal to or less than 0.3 mm and circularity set equal to or less than ±0.3 mm, and the discharge gap between the dielectric on the inner peripheral surface of the ground electrode and the high voltage electrode may be set to less than 1 mm over the entire length of the electrode.

The ozone generator may further comprise electrode holding means for holding the high voltage electrode at a predetermined position inside the ground electrode.

The electrode holding means may have protrusions dispersingly formed on the outer peripheral surface of the high voltage electrode.

The electrode holding means may further comprise a stopper piece made of insulator material disposed at a gas outlet side of the high voltage electrode and secured to the ground electrode side for positioning the high voltage electrode in an axial direction.

The electrode holding means may comprise spring bodies disposed dispersingly in a peripheral direction on the outer peripheral surface of the high voltage electrode.

The high voltage electrode may be made of an ozone-resistant metal material and may have a thickness of equal to or less than 2 mm.

The high voltage electrode may be coated with chromium oxide on the surface.

The ground electrode may be made of ozone-resistant metal material and the entire inner peripheral surface thereof may be lined with glass as a dielectric.

The vessel may be a horizontal type vessel comprising a rectangular-sectional body, end plates for closing front and rear ends thereof through airtight members, and a pair of partition walls for defining the feed gas chamber, the ozonized gas chamber, and the water jacket in the body, the ground electrode may be detachably disposed between the pair of partition walls so as to liquid-tightly penetrate the partition walls, and the inlet, the outlet, and cooling water inlet and outlet for the water jacket may be provided on the peripheral surface of the body.

The ozonized gas chamber may have a depth of equal to or less than 30 cm.

The feed gas inlet may be provided on the upper side of the body, and the ozonized gas outlet may be provided on the lower side of the body.

A part where the ground electrode penetrates the partition walls may be provided with a sealing member and a holding member for holding the sealing member and the ground electrode.

The ozone generator may further comprise a conductive coil spring wound around the peripheral surface of the ground electrode, the coil spring together with the electrode holding member being retained with bolts on the partition walls.

The ozone generator may further comprise a partition plate approximately at the center of the water jacket to form a U-shaped cooling water passage, and wherein cooling water inlet and outlet may be provided on the lower surface of the body which communicate with the cooling water passage.

An upper part of the water jacket may be open to the atmosphere, and a cooling water supply tube and an overflow outlet tube may be provided at the upper part of the water jacket.

The ozone generator may further comprise a nitrogen gas bubbling tube provided for bubbling nitrogen gas from the outside in cooling water in the water jacket.

The ozone generator may further comprise a film seal provided on the surface of cooling water contained in the water jacket for preventing the cooling water from directly contacting with the atmosphere.

The ozone generator may further comprise a water leakage sensor disposed at the bottom of the gas chambers.

The ozone generator may further comprise a cooling water distributor disposed in the feed gas chamber or the ozonized gas chamber, and an ozone-resistant insulation tube provided between the distributor and the high voltage electrode.

At least one of the end plates may be provided with a view window for observing inside the body.

At least one of the end plates may be hinged with an end of the body as a door.

Each of the high voltage electrodes may be connected through an overcurrent protection fuse with a bus bar of the high frequency power source leading into the vessel.

The vessel and peripheral devices thereof may be disposed on a common pedestal as a single unit.

The above and other objects, effects, features and advantages of the present invention will become more apparent from the following description of embodiments thereof taken in conjunction with the accompanying drawings.

BRIEF DESCRIPTION OF THE DRAWINGS

FIGS. 19 are characteristic diagrams showing relationships between input power and ozone concentration, and input power and power consumption for comparing the electrode cooling system of the present invention with the prior art, in which

FIGS. 20 are characteristic diagrams showing relationships between input power and ozone concentration, and input power and power consumption using the discharge gap between the ground electrode and the high voltage electrode of the present invention as a parameter, in which

DETAILED DESCRIPTION OF PREFERRED EMBODIMENTS

Figure 1A:
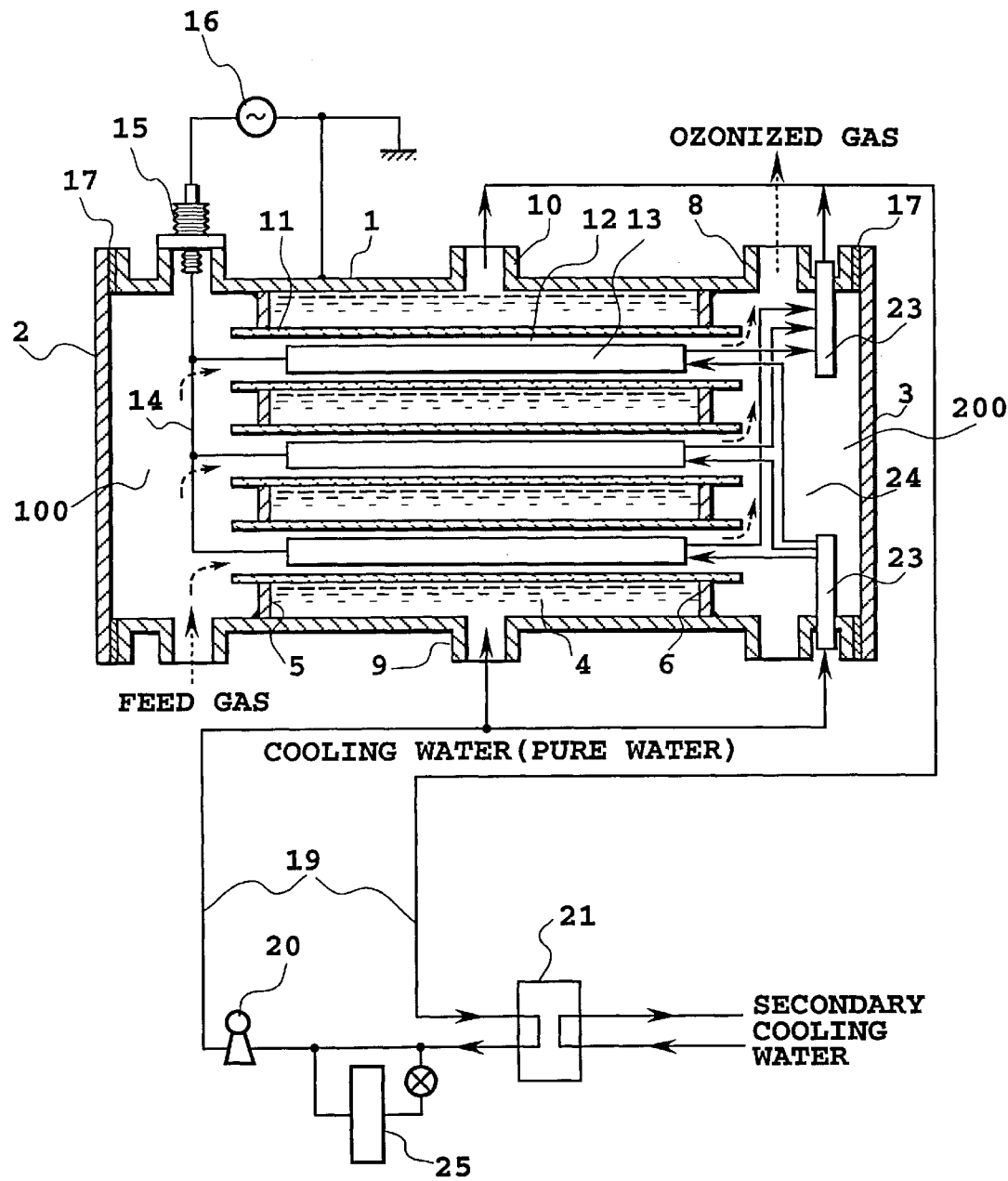
FIG. 1A is a schematic cross sectional view showing the entire structure of an ozone generator according to an embodiment of the present invention.

Embodiments of the present invention will now be described in detail with reference to the drawings. Note that in the following description of the embodiments throughout the drawings, the same reference numerals as in FIG. 25 denote the same parts, and a detailed description thereof will be omitted.

Figure 25A:
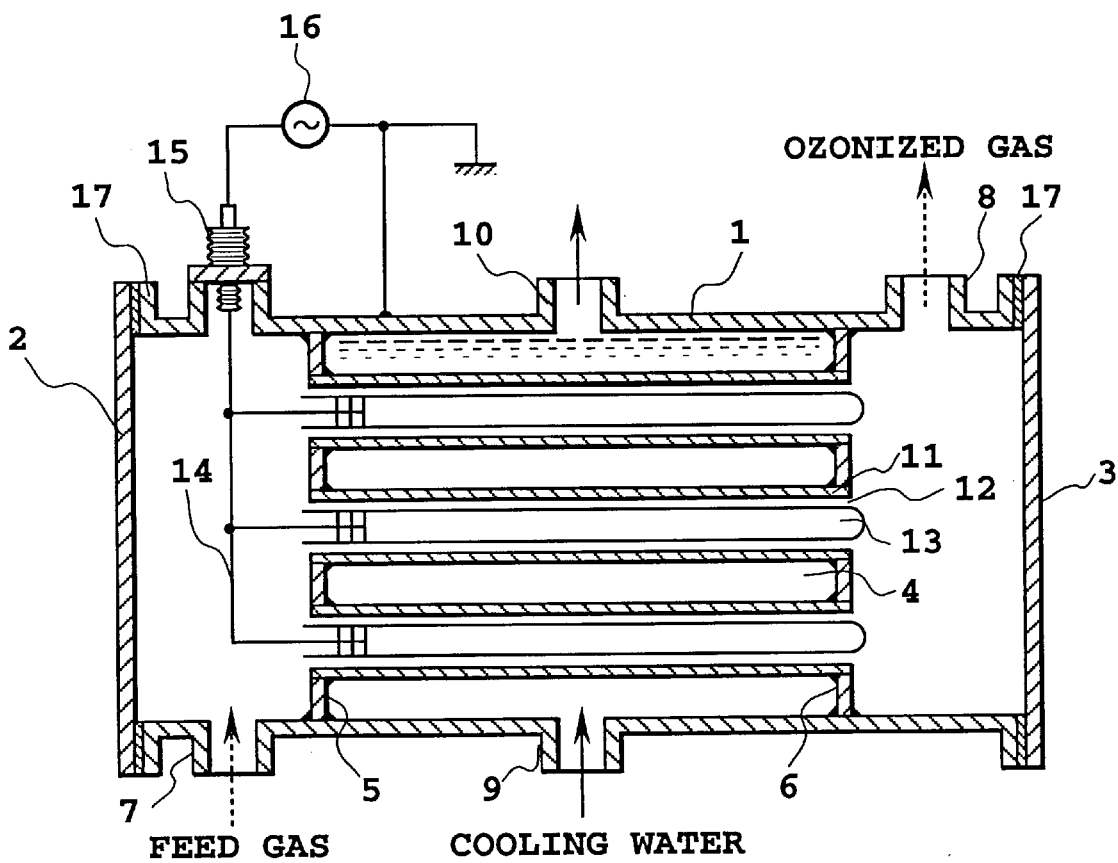
FIGS. 25A and 25B are a longitudinal cross sectional view of a prior art ozone generator and a transverse cross sectional view of a body.
Figure 25B:
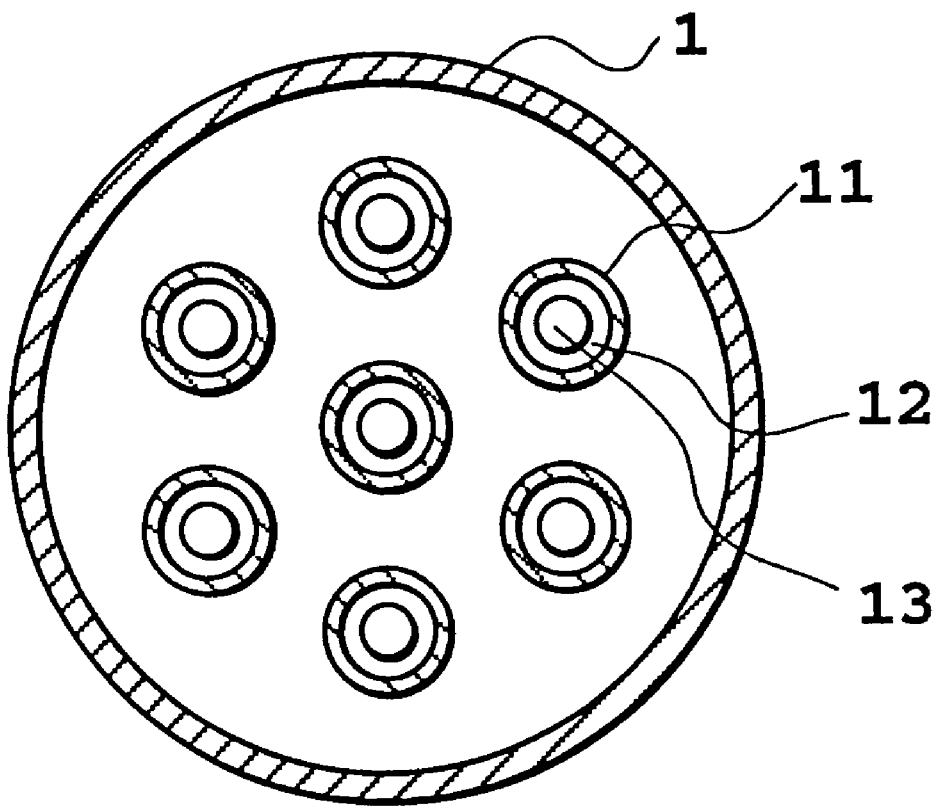
Figure 26A:
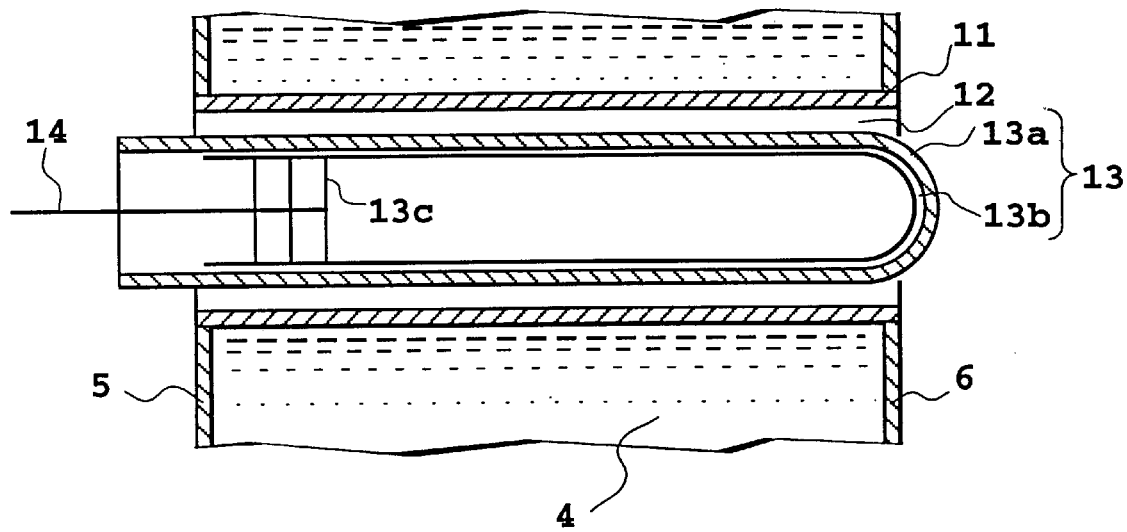
FIGS. 26A and 26B are a longitudinal cross sectional view and a transverse cross sectional view of a prior art ozone generating tube.
Figure 26B:
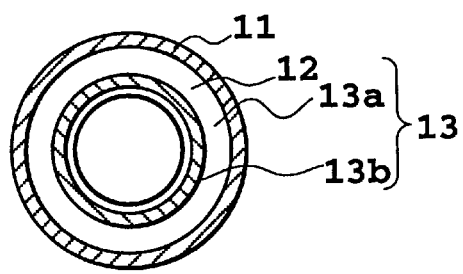

FIG. 1A shows an entire structure of an embodiment of the present invention, and a detailed structure of respective portions will be shown in FIG. 2 and after. First, main features of the present embodiment differing from those in the prior art shown in FIG. 25 are listed below.

a) A body 1 of a vessel is rectangular in section as shown in FIG. 2.

b) In an ozone generating tube incorporated in the body 1, unlike the prior art structure, a cylindrical tube ground electrode 11 comprises a metal tube (stainless steel tube) 11a and a glass dielectric 11b which is lined on an inner surface of the metal tube, and the glass dielectric is cooled through the metal tube 11a with cooling water supplied to a water jacket 4. Further, a high voltage electrode 13 concentrically disposed across a discharge gap 12 inside the ground electrode 11 has a hollow cylindrical structure made of stainless steel, which is also directly cooled by flowing cooling water in the high voltage electrode 13.

c) Pure water, which has a high electrical insulation resistance, is used as the cooling water supplied to the water jacket 4 and the high voltage electrode 13, thereby preventing short circuit of the high voltage electrode 13 to the ground side through the cooling water, a power loss due to a leakage current to the cooling water, and an increase in cooling water temperature.

d) A discharge gap 12 between the ground electrode 11 and the high voltage electrode 13 of the ozone generating tube is set to less than 1 mm over the entire length of the electrode.

Furthermore, to supply cooling water to the high voltage electrode from outside, in the present embodiment, two cooling water distributors 23 for introduction and discharge of cooling water are provided in an ozonized gas chamber 200 between an end plate 3 on the ozone outlet side and a partition wall 6 defining the water jacket 4, each of the cooling water distributors is connected with the high voltage electrode 13 by an insulation tube 24. Still further, the insulation tube, in view of corrosion resistance to ozone, may be made of a synthetic resin material having an ozone resistant property such as polytetrafluoroethylene resin (PTFE), tetrafluoroethylene-hexafluoropropylene copolymer resin (FEP) or perfluoroalkoxy polymer (PFA).

Yet further, a depth of the ozonized gas chamber 200 is set to less than 30 cm. That is, if the ozonized gas chamber is too large in volume, a long period of time is taken until the ozone concentration reaches an equilibrium. Where a volume of the ozonized gas chamber 200 is V1, and a flow rate of ozonized gas flowing through the chamber is V2/min, it is confirmed from the experimental result that a replacement rate of the chamber 200 is several times V1/V2. In view of this point, it is desirable to construct the volume of the ozonized gas chamber 200 as small as possible. Then, with a cross sectional area capable of disposing a predetermined number of ozone generating tubes, when the depth of the ozonized gas chambers is set to about 30 cm as described above, it is possible to ensure an installation space of the cooling water distributors 23 and the insulation tubes disposed in the chamber 200 while suppressing the volume thereof to a low value.

Yet further, external cooling water pipings 19 are connected between the cooling water inlet side and outlet side distributors 23 and between an inlet 9 and an outlet 10 of the water jacket 4 formed in the body 1. A recirculation pump 20, a heat exchanger 21, and an ion exchanger 25 for water purification are provided in the piping passage, and pure water is recirculated to the water jacket 4 surrounding the ground electrode 11 and to the high voltage electrode 13 to cool the individual electrodes with water.

Next, detailed structure of individual portions in FIG. 1 will be described with reference to FIG. 2 and after. First, as shown in FIGS. 2A and 2B, an end plate 2 is retained to one end of the body 1, which is rectangular in section, and an end plate 3 is retained to the other end of the body with bolts (not shown) through a seal 17. In the present embodiment, the seal 17 is a frame-like flat plate gasket made of a material having a resistance property to ozone such as fluororubber, chlorosulfonated polyethylene rubber, ethylene-propylene rubber, polytetrafluoroethylene resin (PTFE), tetrafluoroethylene-hexafluoropropylene copolymer resin (FEP), or perfluoroalkoxy polymer (PFA), which is adhered, for example, using an adhesive to the end surface of the body 1 or to the periphery of the end plates 2 and 3. In addition to the above-described gasket, an O-ring can be used as the seal 17 as well.

Further, with vessel being rectangular in section as shown and arranged horizontally, the following advantages are obtained as compared with the prior art vessel round in section. Specifically, according to a simulation conducted on the flow of cooling water in the water chamber 4 in a plane perpendicular to the electrode axis, it is found that the flow of cooling water in the vicinity of the vessel wall is more uniform in the rectangular section than the round section of the body 1. Further, when comparing a round-sectioned vessel of 1 m in diameter with a rectangular-sectioned vessel of 1 m on one side, the number of ozone generating tubes that can be incorporated within the body is 61 for the round-sectioned vessel and 85 for the rectangular-sectioned vessel. Thus, the rectangular vessel is higher in space efficiency.

Figure 3A:
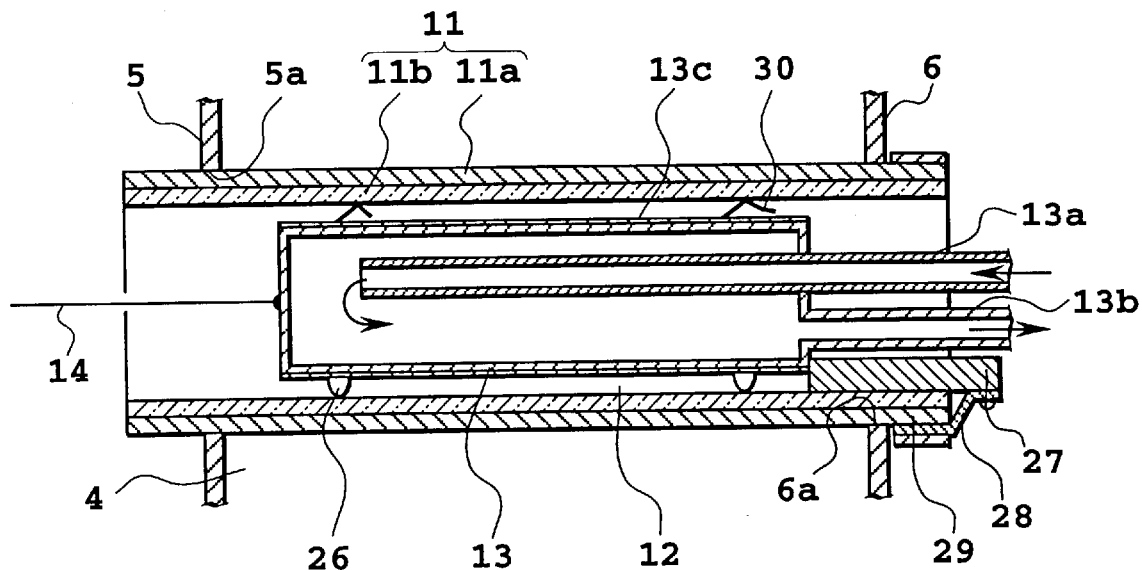
FIG. 3A is a longitudinal cross sectional view showing the ozone generating tube.
Figure 3B:
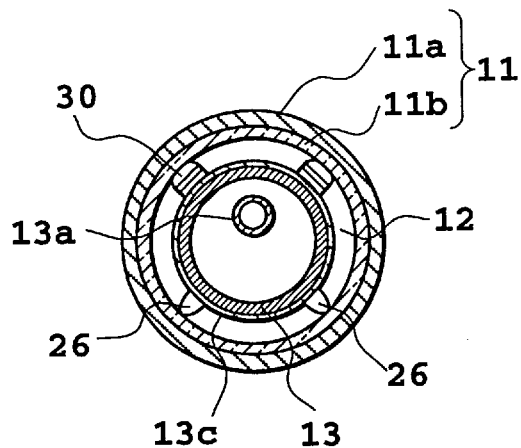
FIG. 3B is a transverse cross sectional view of FIG. 3A.

Next, a detailed structure of the ozone generating tube is shown in FIGS. 3A and 3B. In the Figures, the ground electrode 11 is formed by lining the inner surface of the cylindrical metal tube 11a with glass 11b by way of welding or the like. The glass dielectric is interlaid between the ground electrode 11 and the high voltage electrode 13 as in the prior art, however, since the glass 11b is lined on the inner surface of the metal tube 11a of the ground electrode, the glass 11b can be efficiently cooled with cooling water flowing in the water jacket 4 through the metal tube 11a which is good in heat conduction. Further, since the fragile and easily breakable glass 11b is surrounded and protected outside with the metal tube 11a, there is no danger of damaging it during maintenance or reassembling. Still further, since the glass dielectric layer 11b is always subjected to a compressive stress in the operation temperature range due to a difference in thermal expansion coefficient from the metal tube 11a, the glass dielectric layer 11b is increased in mechanical strength and is thus difficult to be damaged.

Power W applied to the ozone generating tube is represented by the following equation.

$$W = f \cdot C_g \cdot S((V_s+V_e)2E_p - (1+C_a/C_g)(V_s+V_e))$$

wherein, f: frequency, Ca and Cg: capacitances of gap and dielectric, S: discharge area, Ep: peak voltage, Vs and Ve: discharge start voltage and extinction voltage.

Therefore, it is preferable that the glass 11b is high in permittivity, small in dielectric loss, high in withstanding voltage, and low in softening temperature because it is welded with the metal tube 11a, and from this point of view, one of soda glass, lead glass, and borosilicate glass is used. On the other hand, the material of the metal tube 11a, in view of ozone resistance, preferably uses stainless steel selected from SUS304, SUS316, SUS304L, and SUS316L. In order to maintain the discharge gap in uniform and less than 1 mm, in fabricating the ground electrode, it is machined with an electrode bending accuracy of equal to or less than 0.3 mm per 1 m of electrode length and a circularity of equal to or less than ±0.3 mm per 1 m of electrode length.

On the other hand, the hollow cylindrical high voltage electrode 13 which is inserted and concentrically disposed in the ground electrode 11, for directly cooling with pure water flowed in the electrode, is welded with inlet and outlet pipes 13a and 13b at one end of the electrode. The inlet pipe 13a, to smooth the flow of cooling water in the high voltage electrode 13, is extended to the vicinity of the other end of the electrode 13. Since the surface of the high voltage electrode 13 is exposed to ozone, its material uses stainless steel selected from SUS304, SUS316, SUS304L, and SUS316L as in the ground electrode in view of the ozone resistance, and thickness thereof is set equal to or less than 2 mm considering heat transfer to the cooling water. Silent discharge between the electrodes is an aggregate of small streamers, the surface of the high voltage electrode is locally heated and sputtered by each streamer, and sputtered particles tend to deposit on the surface or flow out to the downstream side along with the ozonized gas, resulting in degradation of the electrode. Then, in the present embodiment, the surface of the high voltage electrode 13 is coated with chromium oxide 13c to prevent degradation of the electrode.

Yet further, in an actual product, the high voltage electrode is about 7 cm in diameter, about 1 m in length, and the discharge gap between the electrode and the ground electrode 11 is determined by the bending accuracy of the electrode. Then, in order to set the discharge gap uniform and less than 1 mm over the entire length of the electrode, it is preferable to manufacture the high voltage electrode with the bending accuracy of less than 0.2 mm per 1 m of the electrode length and the circularity is within ±0.1 mm per 1 m of the electrode length.

Yet further, to maintain a predetermined discharge gap 12 between the ground electrode 11 and the high voltage electrode 13 in the ozone generating tube in the assembled state with the high voltage electrode 13 inserted in the ground electrode 11, in the arrangement shown in FIGS. 3A and 3B, protrusions 26 functioning as a spacer are formed dispersingly at a plurality of positions on the surface of the high voltage electrode 13. The protrusions 26 are formed by welding a welding bead at two positions apart in the peripheral direction on opposite ends of the high voltage electrode 13 and grinding the tip of the welding bead according to a predetermined discharge gap. When the protrusions 26 are faced down and inserted into the ground electrode 11, the high voltage electrode 13 contacts against the inner peripheral surface of the glass 11b on the ground electrode side through a total of four protrusions 26 formed at the front and rear ends, thereby forming and maintaining a uniform discharge gap between the ground electrode.

Yet further, when the feed gas flows in the discharge gap 12, a pressure difference is produced between the gas inlet and outlet sides of the high voltage electrode 13. In this case, when the pressure in the axial direction acting on the high voltage electrode due to the pressure difference is greater than mass X static frictional coefficient (a frictional coefficient between glass/stainless steel is about 0.7), the high voltage electrode 13 may move in the axial direction from the predetermined position during operation. Then, in the arrangement shown in FIG. 3, a stopper piece 27 made of an insulator is provided on the gas outlet side of the high voltage electrode 13 as an electrode holding means for positioning and securing the high voltage electrode 13, the stopper piece 27 is retained on the inner periphery of the ground electrode 11 with a hose band 29 through a bracket 28. With this arrangement, even when a pressure in the axial direction is applied to the high voltage electrode 13 due to the gas pressure difference, the electrode 13 contacts against the stopper piece 27 and will not move from the predetermined position.

As another electrode holding means, curved leaf springs 30 may be provided on the surface opposing in the radial direction to the protrusions 26 formed on the surface of the high voltage electrode 13, and with the high voltage electrode 13 inserted in the ground electrode 11, the tip of the leaf spring 30 is pressed against the glass surface. With this construction, since the high voltage electrode 13 is pressed by the force of the leaf spring 30, the electrode itself is difficult to be moved even when a gas pressure difference is applied across the both ends of the high voltage electrode 13 as described above.

Figure 4A:
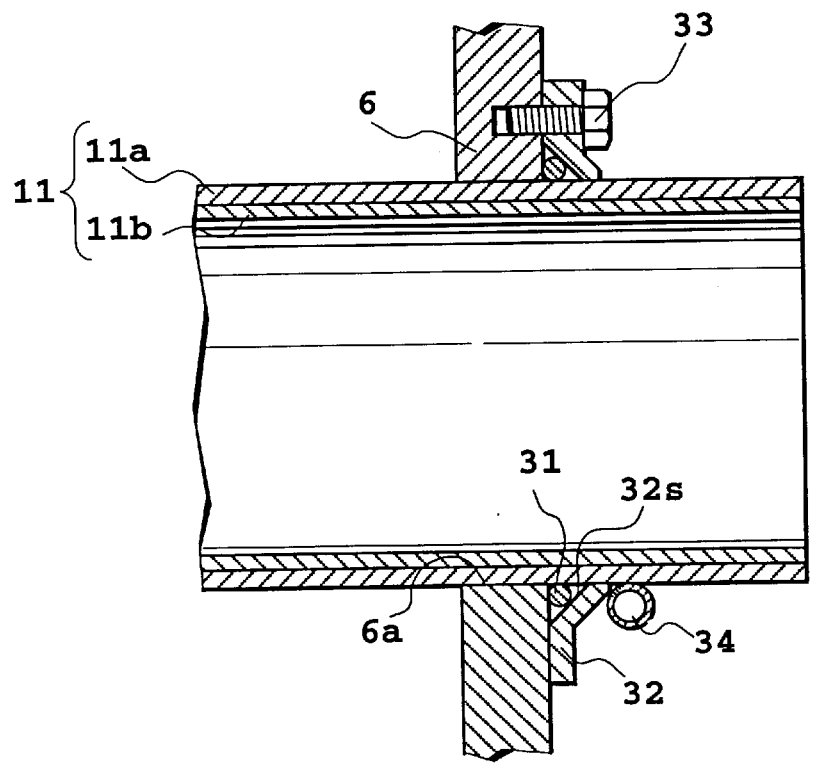
FIG. 4A is a cross sectional view showing a ground electrode mounting portion in FIG. 1A.

Next, a support structure of the ground electrode 11 incorporated in the vessel will be described with reference to FIGS. 4 and 5. In FIG. 4A which shows one of the partition walls, the ground electrode 11 is disposed across the pair of right and left partition walls 5 and 6 defining the water jacket 4 (FIG. 1) as described above, and is detachably disposed penetrating holes 5a and 6a provided in the partition walls. The periphery of the ground electrode 11 penetrating the partition wall is engaged with an O-ring as a sealing member and an electrode holding member 32 having a slanted surface 32s for holding the O-ring, and the electrode holding member 32 is retained with bolts 33 to retain the ground electrode 11 to the partition walls 5 and 6. With this construction, leakage of water and gas is prevented between the water jacket and the gas chambers. At maintenance such as periodical inspection, the electrode holding member 32 can be removed, and the ground electrode 11 is easily pulled out from the partition walls.

Figure 4B:
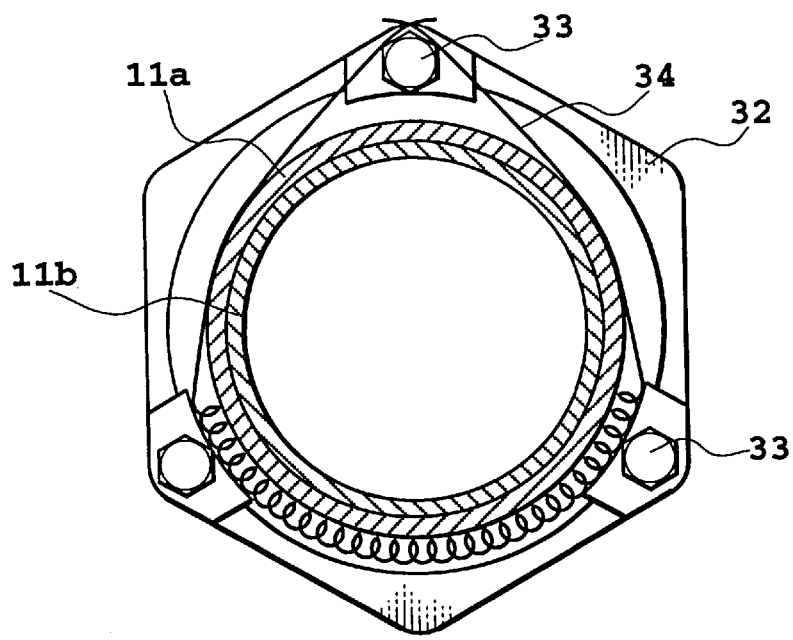
FIG. 4B is a front view of FIG. 4A.

Yet further, while the ground electrode 11 is grounded by contacting with the partition walls 5 and 6, to assure complete grounding, as shown in FIG. 4B, it is preferable that the ground electrode 11 is wound round with a conductive coil spring 34, and the tip thereof is attached to the retaining bolt 33 of the above-described electrode holding member 32 to make it conductive to the partition walls 5 and 6 through the spring 34. With this arrangement, discharge current in the ground electrode 11 flows positively to the ground through the spring 34, the bolt 33, and the partition walls 5 and 6. If the ground electrode 11 is contacted only with the partition walls 5 and 6, potential of the ground electrode 11 tends to be increased due to poor contact, and in the worst case, discharge does not take place between the high voltage electrode. The above arrangement is to prevent such a malfunction.

Figure 5A:
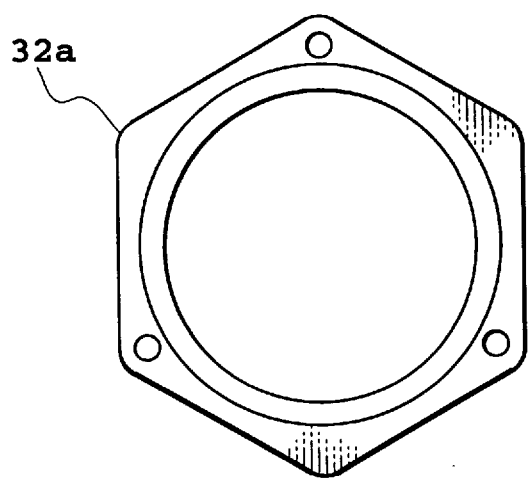
FIGS. 5A and 5B are a front view and a side view of an O-ring holding guide.
Figure 5B:
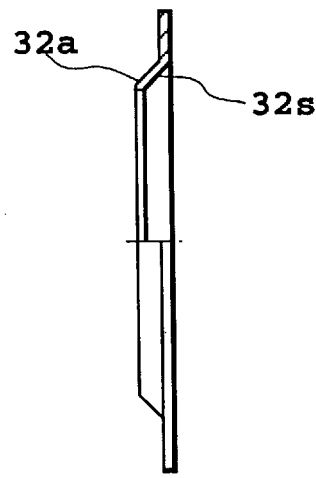
Figure 5C:
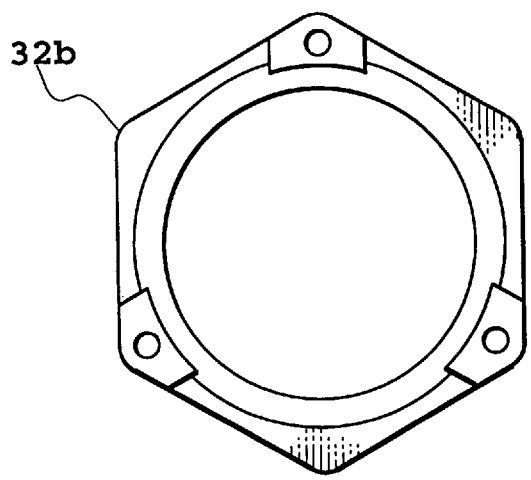
FIGS. 5C and 5D are a front view and a side view of a holding plate.
Figure 5D:
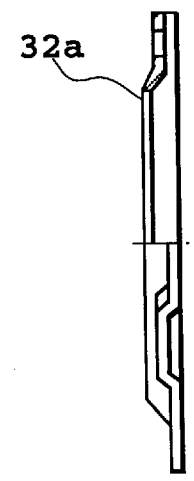
Figure 5E:
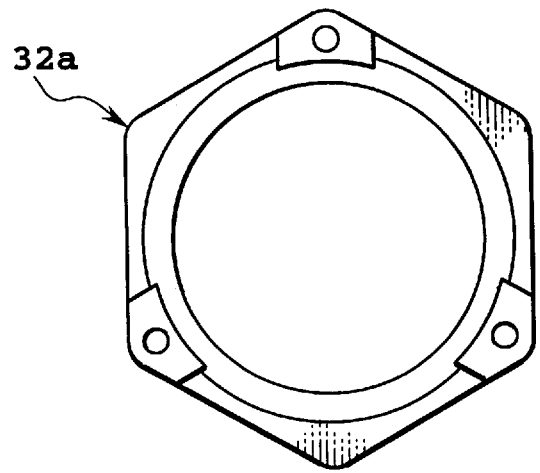
FIGS. 5E and 5F are a front view and a side view of an electrode holding member integrally incorporating the O-ring holding guide and the holding plate.
Figure 5F:
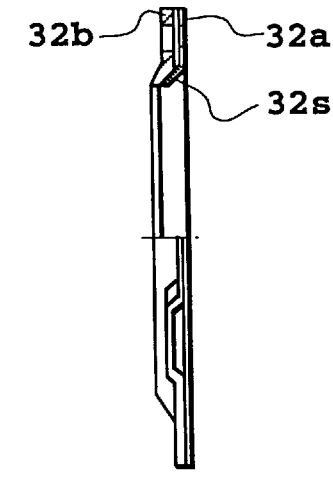

FIGS. 5A to 5F show practical examples of the above-described electrode holding member 32. The electrode holding member 32 comprises two parts including a holding guide 32a, as shown in FIGS. 5A and 5B, formed with the slanted surface 32s, and a ring-formed holding plate 32b as shown in FIGS. 5C and 5D. When mounting the ground electrode 11, first the O-ring is attached to the ground electrode 11, the O-ring is covered with the holding guide 32a, the holding plate 32b is placed on the holding guide 32a, and then fastened altogether to the partition walls 5 and 6 with bolts 33. On the other hand, as shown in FIGS. 5E and 5F, the guide 32a and the holding plate 32b may be integrally constructed.

Figure 6A:
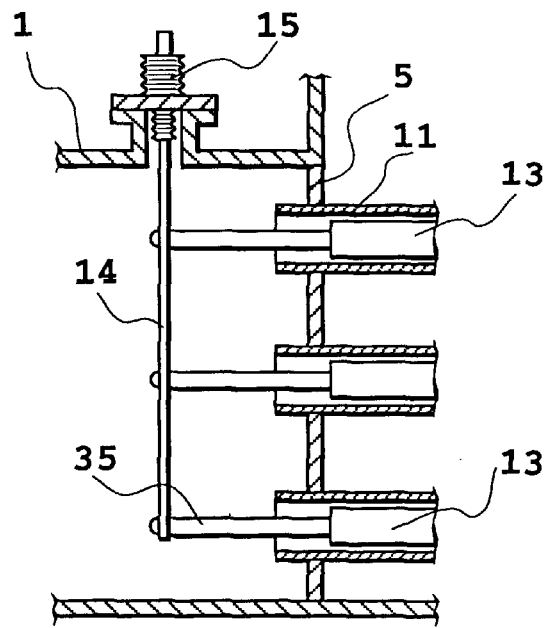
FIGS. 6A and 6B are a side view and a front view showing a power supply structure of the high voltage electrode in FIG. 1A.

Next, a power supply structure to the high voltage electrode 13 will be described with reference to FIGS. 6 and 7. First, in FIGS. 6A and 6B, the high voltage electrodes 13 assembled in the vessel are connected to a bus bar 14 leading into the body 1 through a bushing 15, each through a fuse 35 for overcurrent protection.

By providing the fuse for every high voltage electrode 13 as described above, when an abnormal discharge occurs during operation increasing the current in the electrode, only the fuse 35 connected to the electrode where the abnormality occurs is operated to stop supplying power to that electrode, and the remaining normal electrodes are supplied with power. Therefore, even when an abnormality occurs in some of a plurality of electrodes 13, the ozone generator is not fully stopped, but the operation can be continued with power supply stopped to the abnormal electrodes.

Figure 6B:
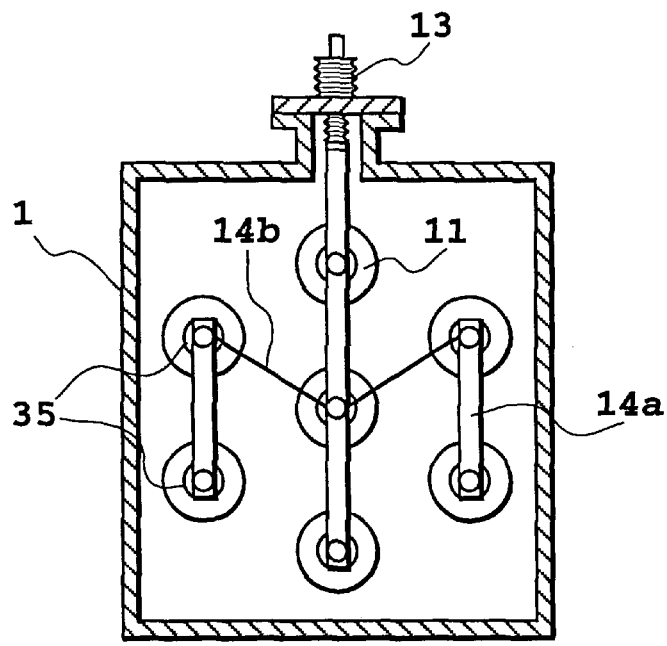

Further, in the present embodiment, the fuses 35 arranged in a vertical line are combined as a group as shown in FIG. 6B, each group of the fuses 35 is connected to each of a plurality of bus bars 14a arranged in the vertical direction, and the individual bus bars 14a are connected with different lead wires 14b.

Figure 7A:
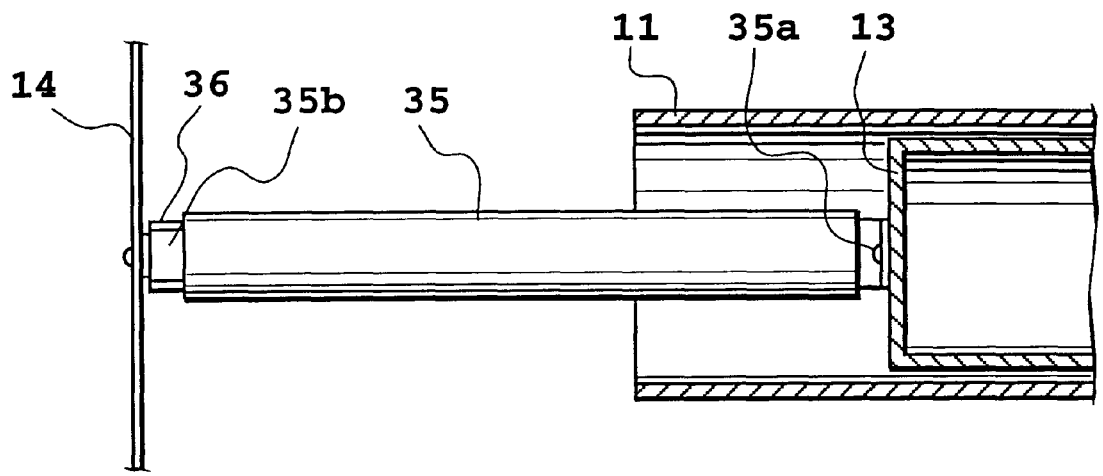
FIGS. 7A and 7B are a side view and a front view showing a fuse mounting structure in FIGS. 6A and 6B, respectively.
Figure 7B:
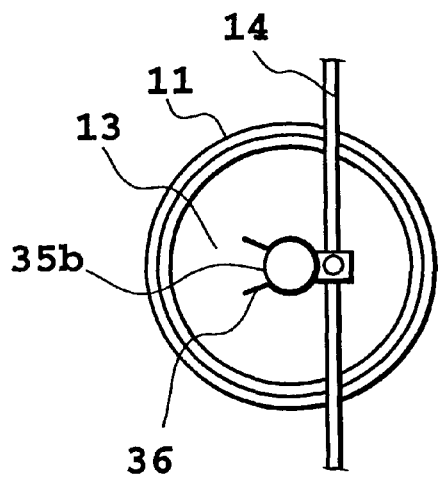

Still further, FIGS. 7A and 7B show a structural example using a clip for the connection of the fuse 35. In this case, the fuse 35 is cylindrically formed having a diameter of the main unit of about 2 cm, a length of about 15 cm, and terminals 35a and 35b at opposite ends. An outer casing of the main unit is made of ceramic and the terminals 35a and 35b are made of stainless steel so that the fuse 35 is not degraded even when exposed to an atmosphere of the ozonized gas. One terminal 35a is screwed to the end surface of the high voltage electrode 13, and the other terminal 35b is engaged to a clip 36 screwed to the bus bar 14. This construction allows the fuse to be simply mounted as compared with the screwing method, and has an advantage that the fuse and the high voltage electrode will not be damaged by torque in screwing.

Figure 19A:
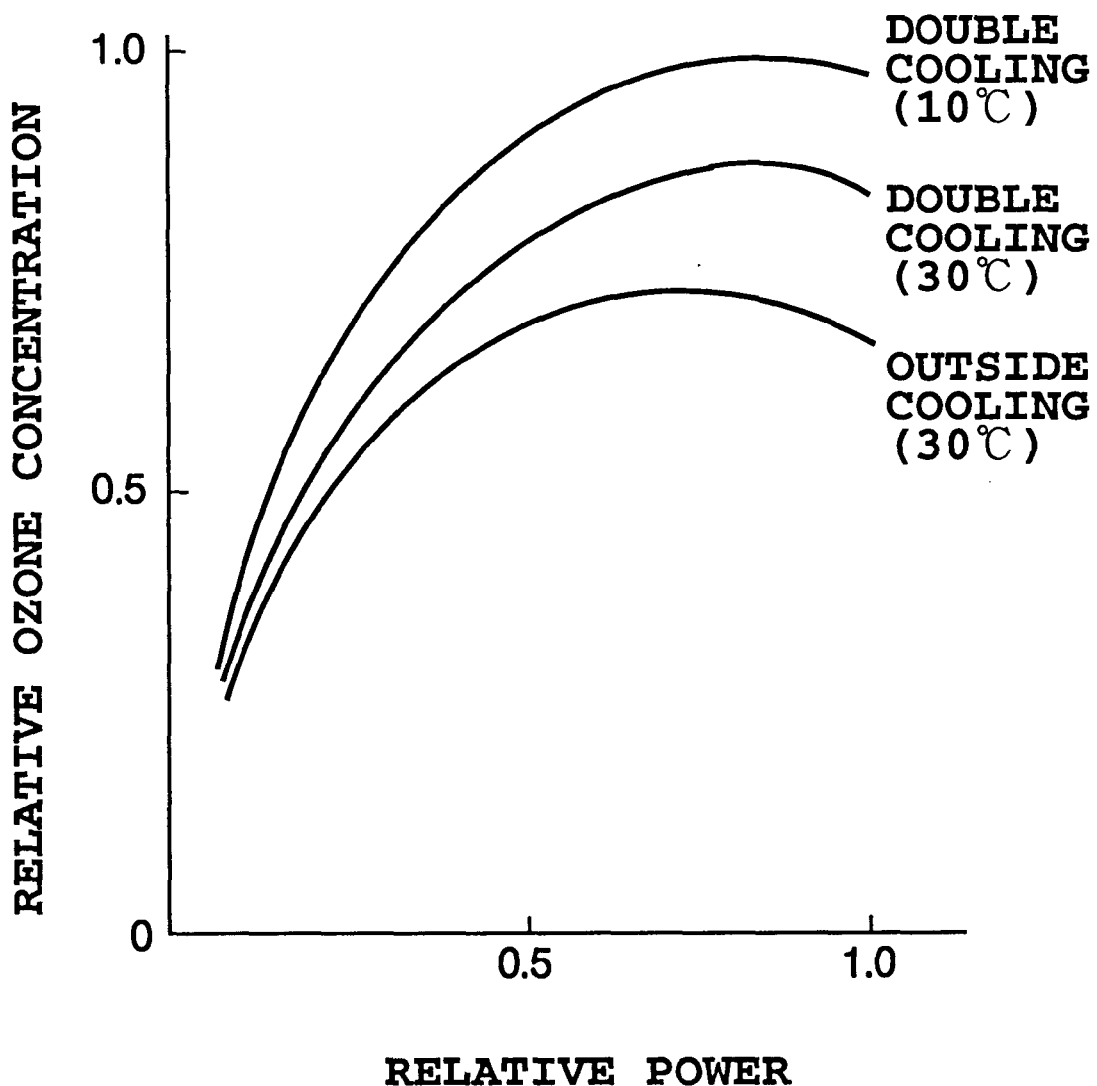
FIG. 19A represents a relationship between relative power and a relative ozone concentration.
Figure 19B:
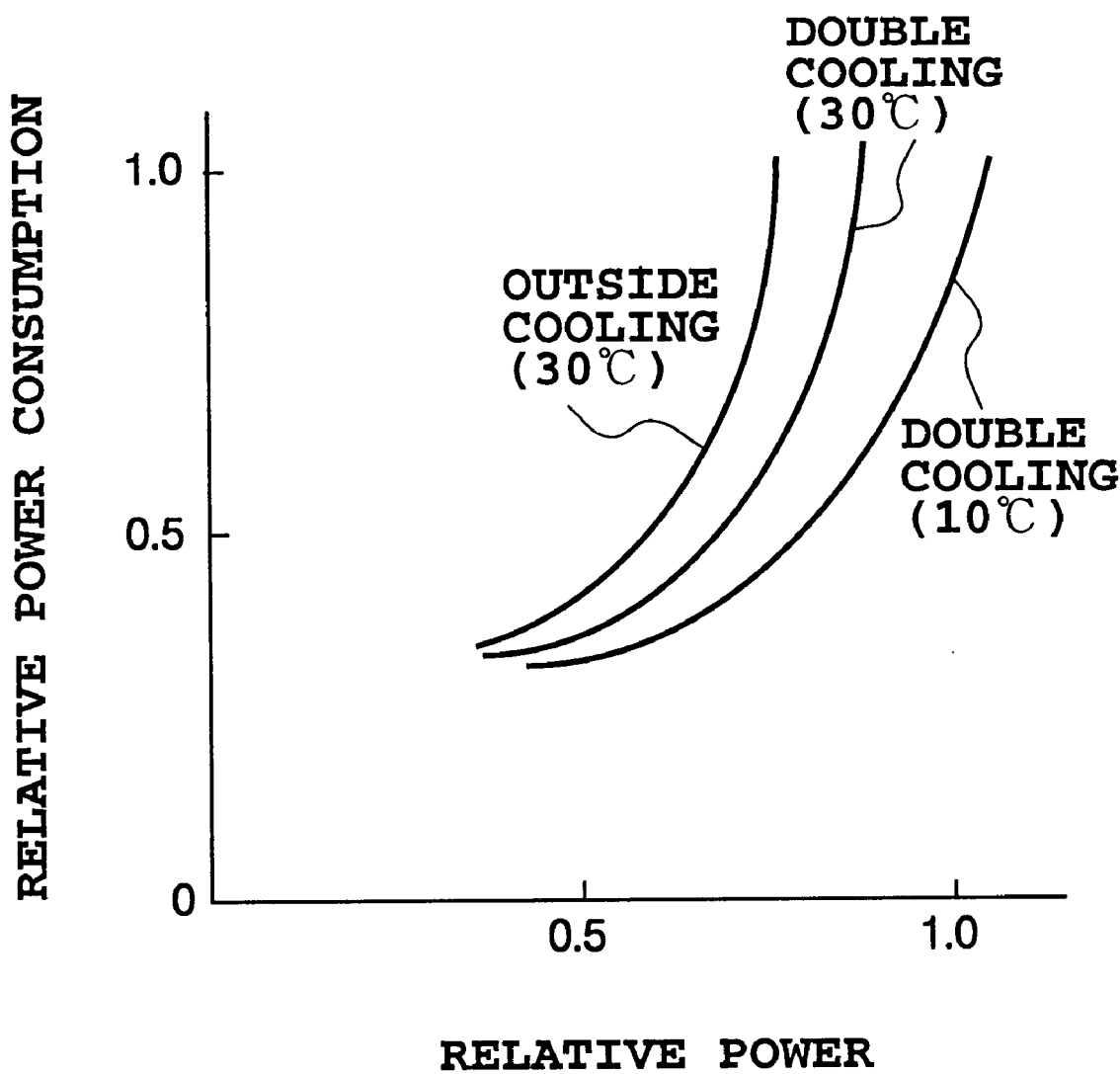
FIG. 19B represents a relationship between relative power and relative power consumption.

Next, operation characteristics of the ozone generator of the above construction will be described. First, FIGS. 19A and 19B are graphs showing the relationships between the input power and the ozone concentration and between the input power and the power consumption for explaining the electrode cooling effect according to the present invention. Then, the electrode cooling system of the prior art generator shown in FIG. 25 is defined as "outside cooling" and the electrode cooling system of both the ground electrode and the high voltage electrode according to the present invention is defined as "double cooling". The discharge gap between the ground electrode and the high voltage electrode is 1 mm, and the feed gas is oxygen having a flow rate of 10 liters/min. Here, the relative ozone concentration is a relative value with respect to a maximum ozone concentration when the maximum ozone concentration is standardized to 1.0 cooled by double cooling with cooling water at 10° C., the relative consumption is a relative value to power consumption when the power consumption to obtain the maximum ozone concentration is assumed as 1.0, the relative power is a relative value to the above standardized power. As can be seen from the characteristic diagram 19A, in the outside cooling (cooling water temperature 30° C.), the ozone concentration increases to reach a maximum value and then decreases as the relative power applied to the ozone generating tube is increased. This is because the discharge gap temperature increases, and ozone thermally decomposes while passing through the discharge gap. On the other hand, in the double cooling at cooling water temperature 30° C., the ozone saturation concentration was increased by 20%, and in the double cooling at cooling water temperature 10° C., the saturation concentration was increased by 40%. It can be understood that this is because the discharge gap temperature is decreased by the double cooling to suppress thermal decomposition of ozone produced and to accomplish high concentration of ozone. On the other hand, as can be seen from the characteristic diagram 19B, the power consumption (power required to generate a unit amount of ozone) rapidly increases with increasing relative power in the case of the outside cooling (cooling water temperature 30° C.). On the contrary, in the double cooling (cooling water temperature 30° C.) and in the double cooling (cooling water temperature 10° C.), the individual characteristic curves are shifted to relatively greater power. When these are compared at the same power, the ozone generation amount (=ozone concentration X gas flow rate) increases in the double cooling as compared to the outside cooling, and the power consumption decreases in the reverse. From these facts, it can be understood that an improvement is achieved in ozone generation efficiency by employing the double cooling system.

Figure 20A:
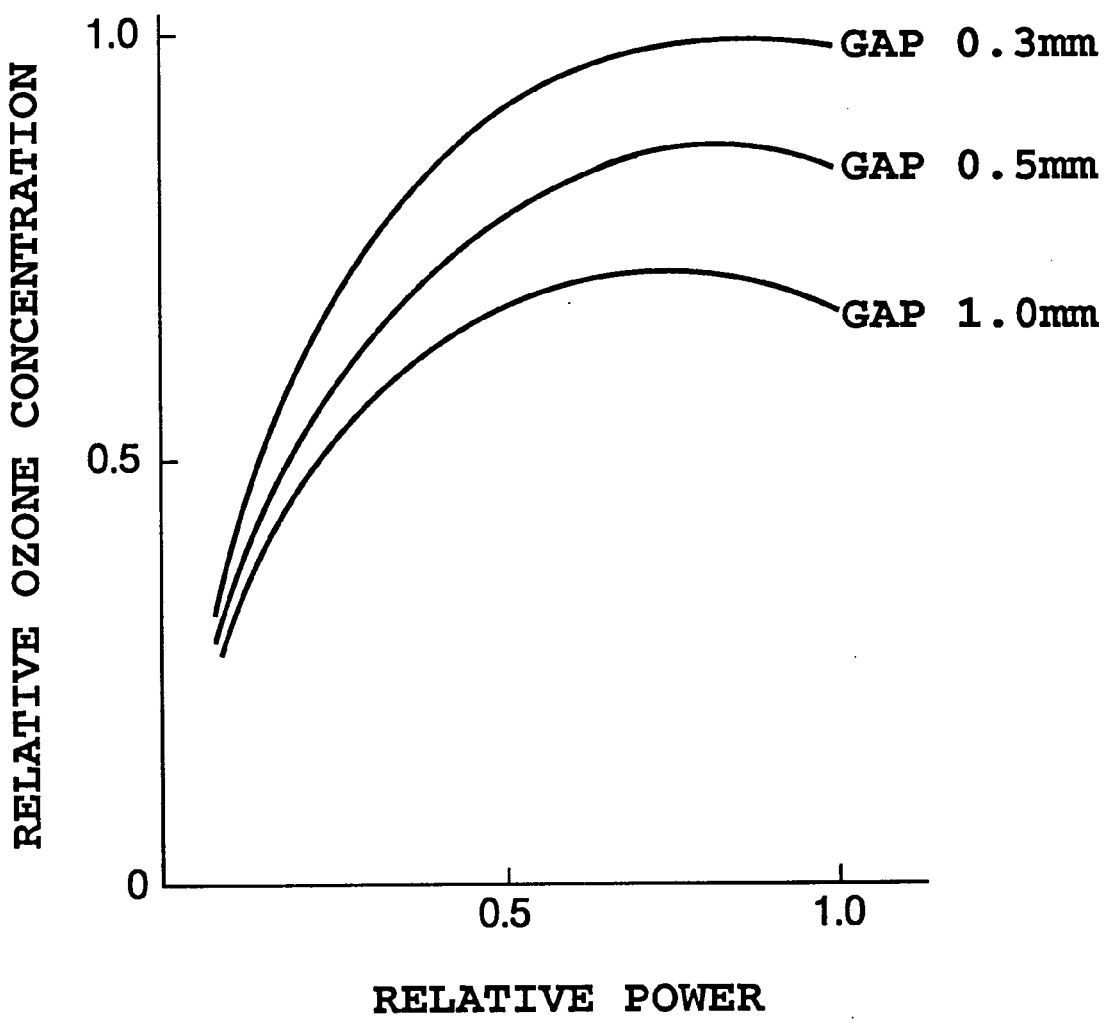
FIG. 20A represents a relationship between relative power and relative ozone concentration.
Figure 20B:
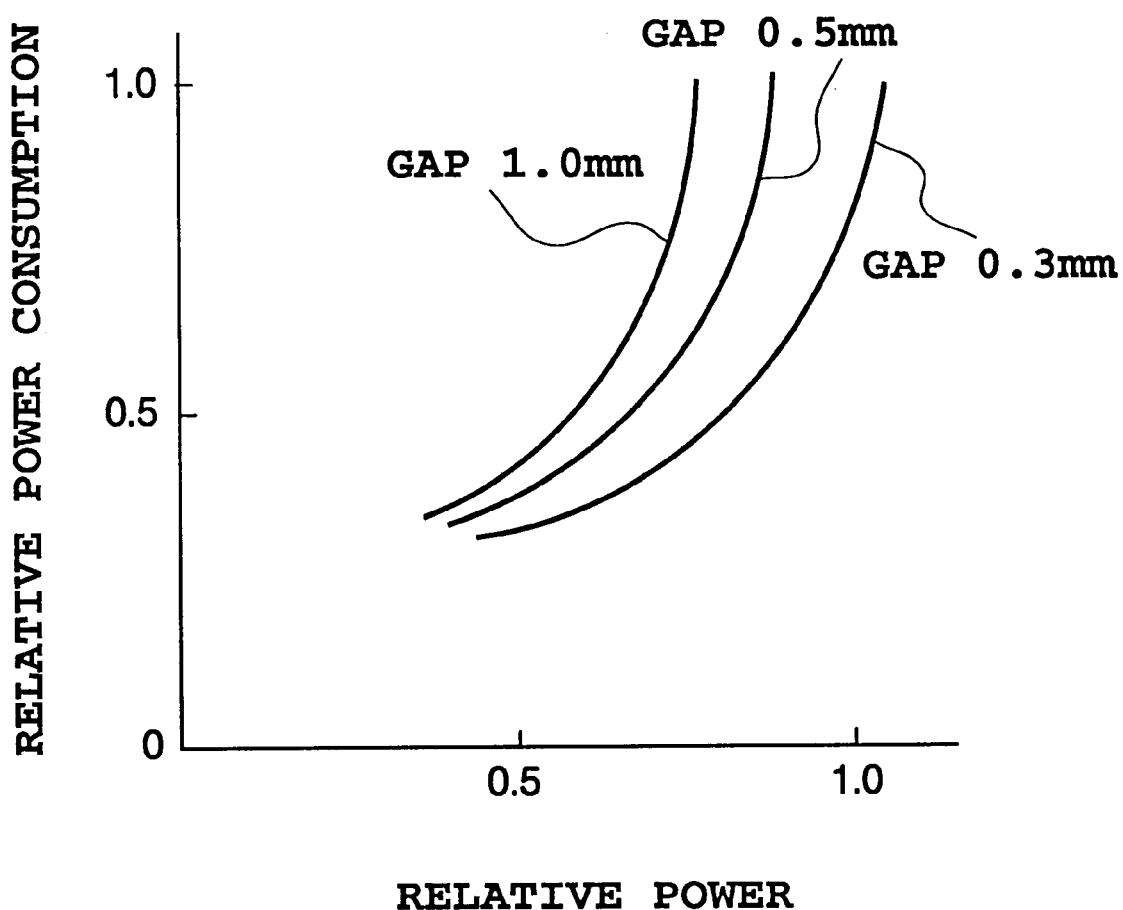
FIG. 20B represents a relationship between relative power and relative power consumption.

FIGS. 20A and 20B are characteristic diagrams individually showing the relationships between the power and the ozone concentration and between the power and the power consumption using the discharge gap distance as a parameter in the above-described double cooling system. Operation conditions are as follows: the cooling water temperature is at 10° C., and oxygen is used as the feed gas having a flow rate of 10 liters/min. As can be seen from FIG. 20A, at a discharge gap of 1 mm, as the relative power applied to the ozone generating tube, the ozone concentration increases to reach a maximum value and then decreases. This is because the discharge gap temperature increases and thermal decomposition of ozone takes place. On the contrary, when the discharge gap is narrowed to 0.5 mm, the ozone saturation concentration is increased by about 10%, and when the discharge gap is further reduced to 0.3 mm, the saturation concentration is increased by 20%. This is an effect that by narrowing the discharge gap, average energy of electrons in the discharge increases and dissociation efficiency of oxygen molecules is improved. Further, when the discharge gap is narrowed, the flow rate of the feed gas is also increased to reduce a stay time in the gap and thermal decomposition of ozone is suppressed to the extent. As can be seen from the fact, by setting the discharge gap to less than 1 mm, the concentration of ozone produced is increased and an improvement is achieved in ozone generation efficiency.

Figure 21:
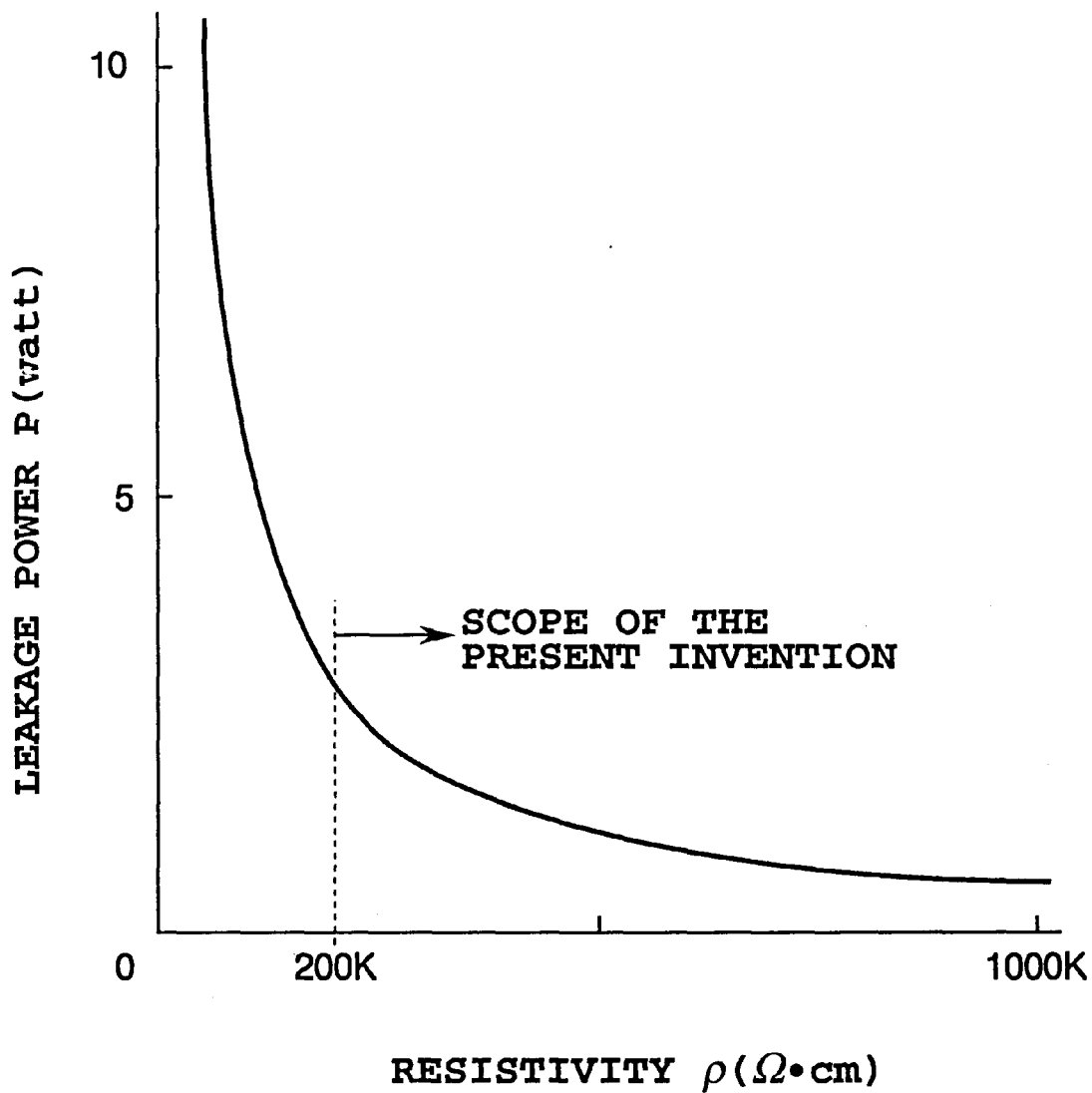
FIG. 21 is a characteristic diagram showing a relationship between specific resistance of pure water used as cooling water of the high voltage electrode according to the present invention and leakage power.

FIG. 21 is a characteristic diagram showing the relationship between resistivity of pure water used as coolant in the present invention and leakage power occurring through the pure water. First, resistance of pure water R and power loss P leaking from the high voltage electrode to the ground side through the pure water in the cooling water piping are represented by the following equations:

$$R=V^2/(\rho L/S)$$

$$P=V^2/R$$

where, V: applied voltage, R: resistance of pure water, $\rho$: specific resistivity of pure water, L: piping length of insulation tube, S: sectional area of the insulation tube.

Here, when the voltage V applied from the high frequency power source to the high voltage electrode is a triangular wave of 8000 V, $\rho$=200 k$\Omega$cm, L=30 cm, S=0.5 cm$^2$ (tube inner diameter 8 mm), the power loss is as small compared as P=2.5 W, which is negligibly small to the power applied to the ozone generating tube (e.g. 3000 W). On the other hand, when the specific resistivity of pure water is smaller than 200 kΩcm, the leakage power loss is rapidly increased. From this fact, it is preferable to use pure water having specific resistivity of equal to or more than 200 kΩcm as cooling water for the double cooling system. The specific resistivity of pure water can be adjusted by controlling the flow rate of ion exchanged pure water by bypassing from the cooling water piping to the ion exchanger 25 shown in FIG. 1.

Figure 1B:
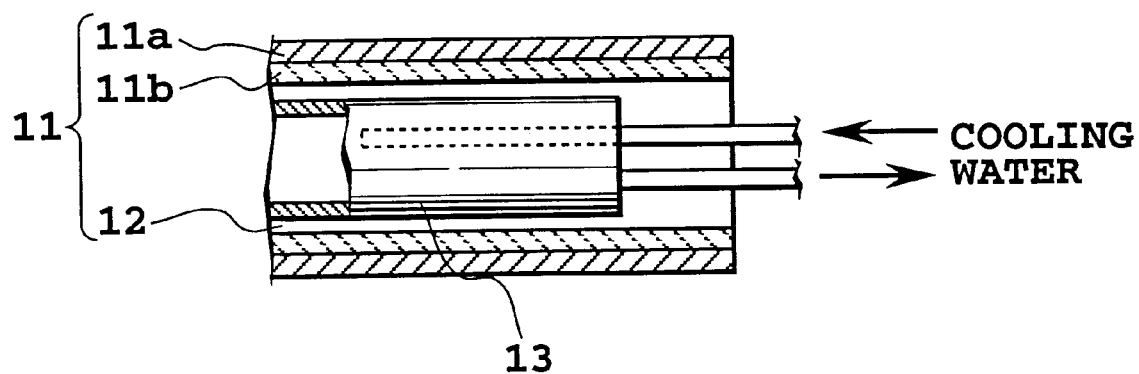
FIG. 1B is a schematic enlarged cross sectional view showing part of an ozone generating tube.
Figure 2A:
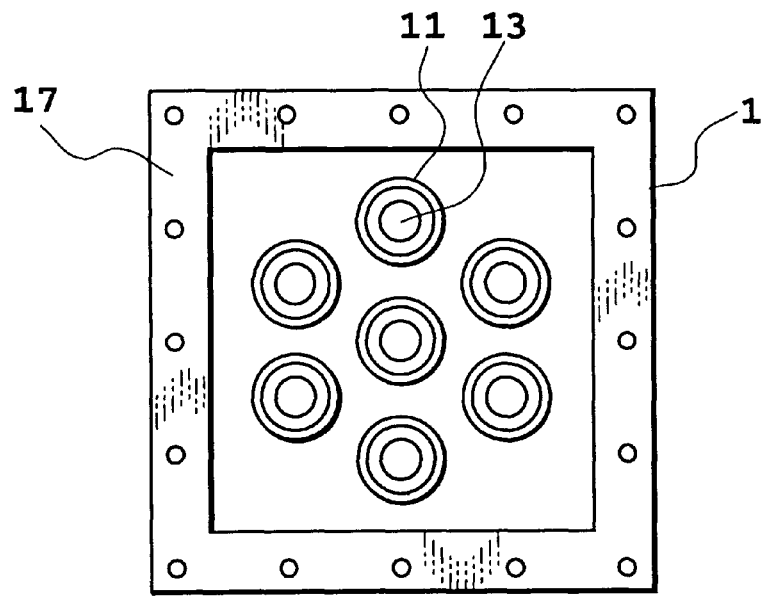
FIG. 2A is a schematic view showing an end of a body of FIG. 1A.
Figure 2B:
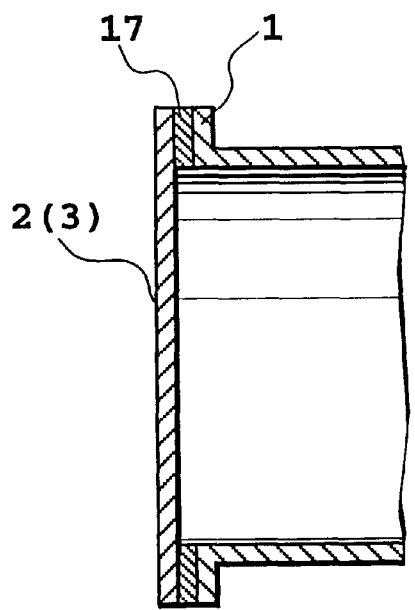
FIG. 2B is a longitudinal cross sectional view showing a body end.
Figure 22:
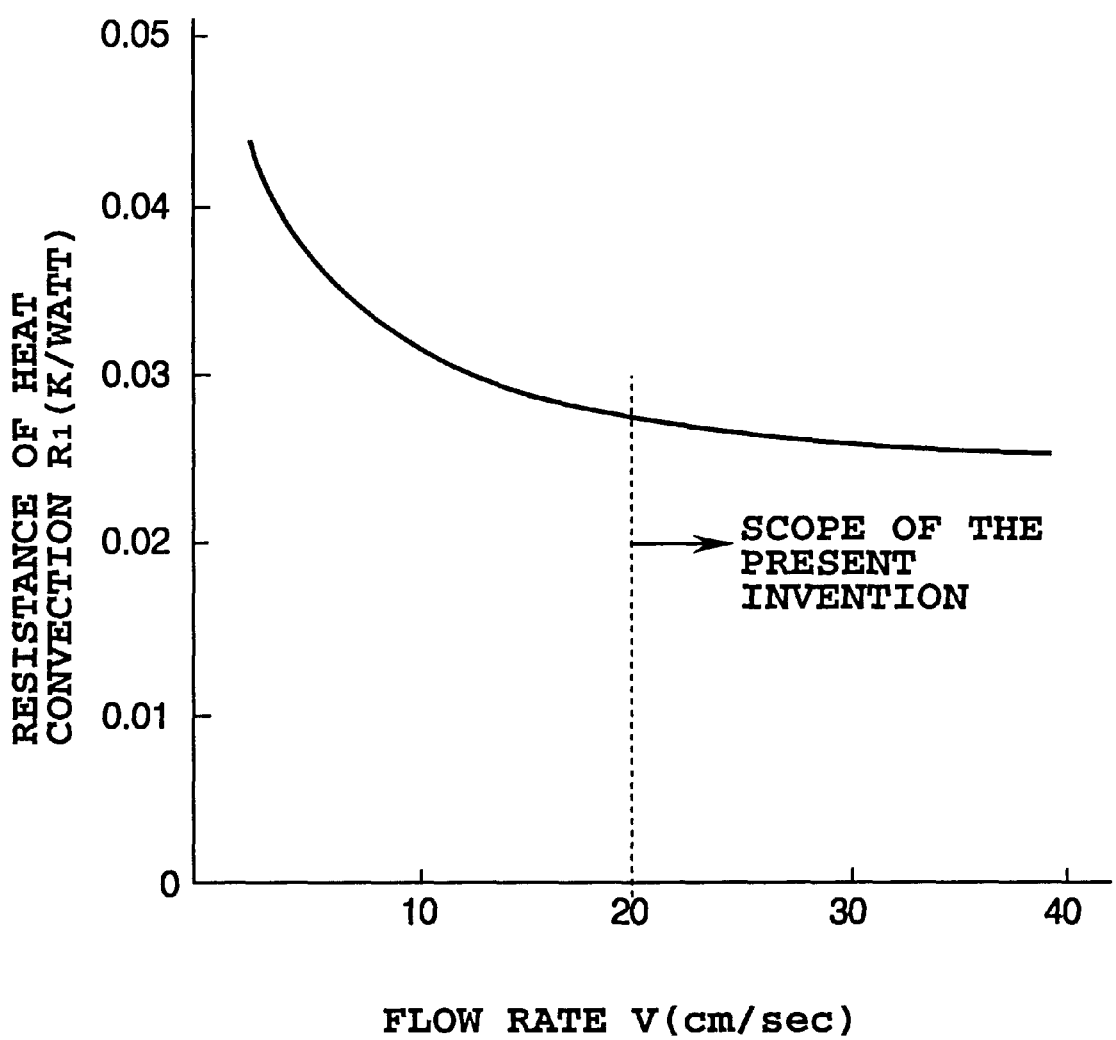
FIG. 22 is a characteristic diagram showing a relationship between flow rate and resistance of heat convection of pure water supplied to the high voltage electrode according to the present invention.

FIG. 22 is a characteristic diagram showing the relationship between the flow rate and resistance of heat convection of cooling water to the high voltage electrode 13 of the embodiment shown in FIG. 1. Specifically, according to the calculation using the thermal network method on the construction of the double cooling system shown in FIG. 1, about 60% of heat evolution by the power applied to the electrode is transferred to the cooling water of the high voltage electrode, and the remaining 40% is transferred to the cooling water of the ground electrode. While to efficiently remove this 60% heat, it is necessary to enhance the cooling efficiency of the high voltage electrode 13, in the state of flowing the cooling water inside the hollow cylindrical high voltage electrode 13, there exists resistance of heat convection R1 represented by the following equation in the boundary between the cooling water and the inner wall surface of the high voltage electrode 13.

$$R1 = 1/(\alpha A) = 1/(N\lambda/d)$$

where, $\alpha$: conductivity of heat convection, A: heat conduction area of high voltage electrode, N: Nusselt number, $\lambda$: heat conductivity of cooling water, d: equivalent diameter of cooling water passage.

In this case, as shown in the characteristic diagram in FIG. 22, the resistance of heat convection R1 rapidly decreases as the flow rate v of the cooling water increases, and saturates to a constant value in the range over 20 cm/sec. According to the calculation, this saturation value is 0.025K/watt. Then, in the present invention, by setting the cooling water flow rate to greater than 20 cm/sec so that the resistance of heat convection becomes nearly the minimum saturation value to suppress the effect of the resistance of heat convection, thereby enhancing the cooling efficiency of the high voltage electrode.

Figure 23:
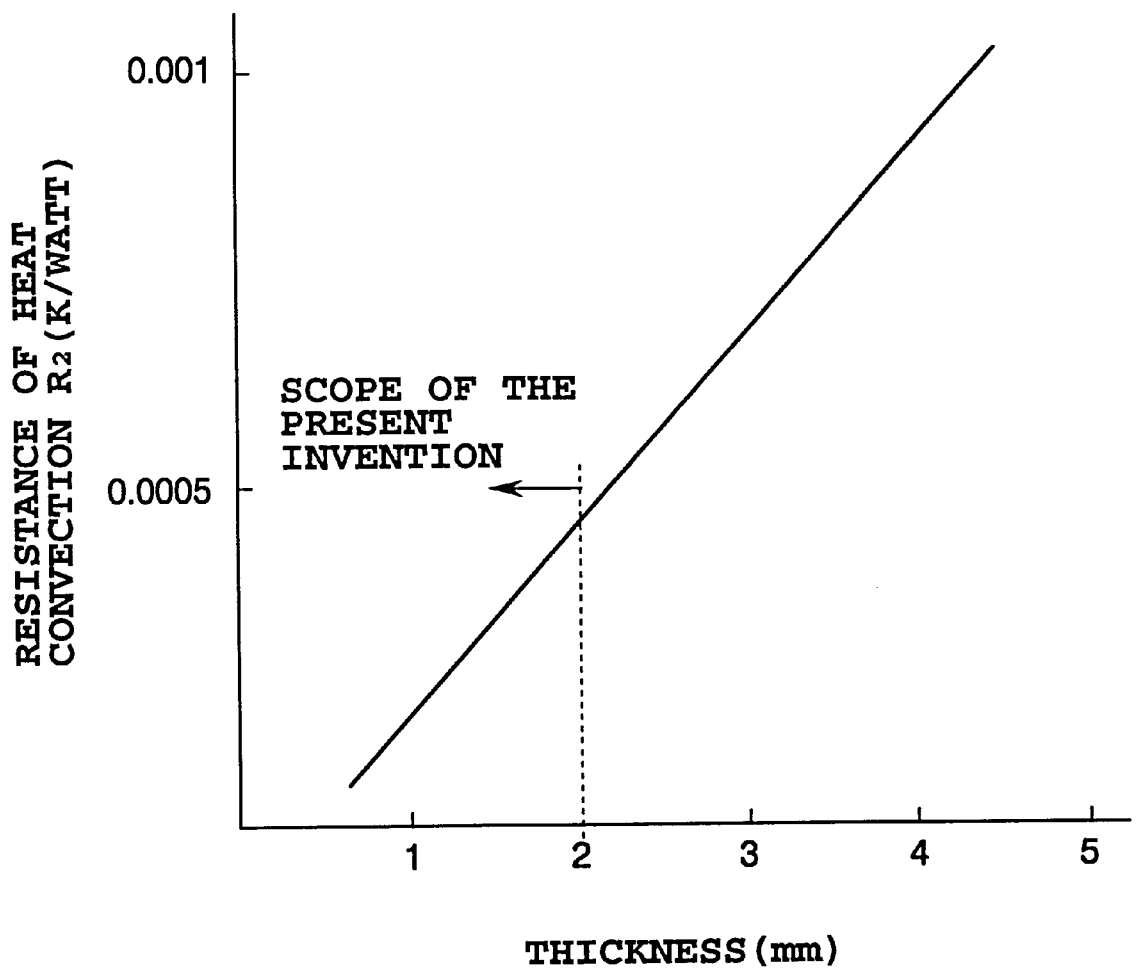
FIG. 23 is a characteristic diagram showing a relationship between thickness and resistance of heat conduction of the high voltage electrode according to the present invention.

FIG. 23 is a characteristic diagram showing the relationship between the plate thickness of the hollow cylindrical high voltage electrode 13 and the resistance of heat conduction of the embodiment shown in FIG. 1. That is, there exists resistance of heat conduction R2 represented by the following equation between the cooling water of the high voltage electrode and the discharge gap.

$$R2 = t/(\lambda A)$$

where, t: thickness of high voltage electrode, $\lambda$: coefficient of heat conduction of high voltage electrode, A: high voltage electrode heat conduction area.

When, according to the above equation, the resistance of heat conduction R2 is calculated for the high voltage electrode made of stainless steel, for example, if the thickness of the high voltage electrode 13 is 2 mm, the resistance of heat conduction is 0.0045K/watt. On the other hand, if the thickness of the high voltage electrode is extremely reduced, it becomes technically difficult to fabricate the high voltage electrode with a bending accuracy of equal to or less than 0.2 mm per 1 m of electrode length and circularity of equal to or less than ±0.1 mm as described above, and the pressure resistance of the electrode itself is decreased, resulting in deformation of the electrode due to water pressure when cooling water is flowed in the electrode. Then, in the present invention, the thickness of the hollow cylindrical high voltage electrode is set equal to or less than 2 mm and equal to or more than e.g. 1 mm, in consideration of the above-described manufacturing accuracy and pressure resistance. This achieves high cooling efficiency of high voltage electrode and increases the concentration of ozone produced.

Figure 8A:
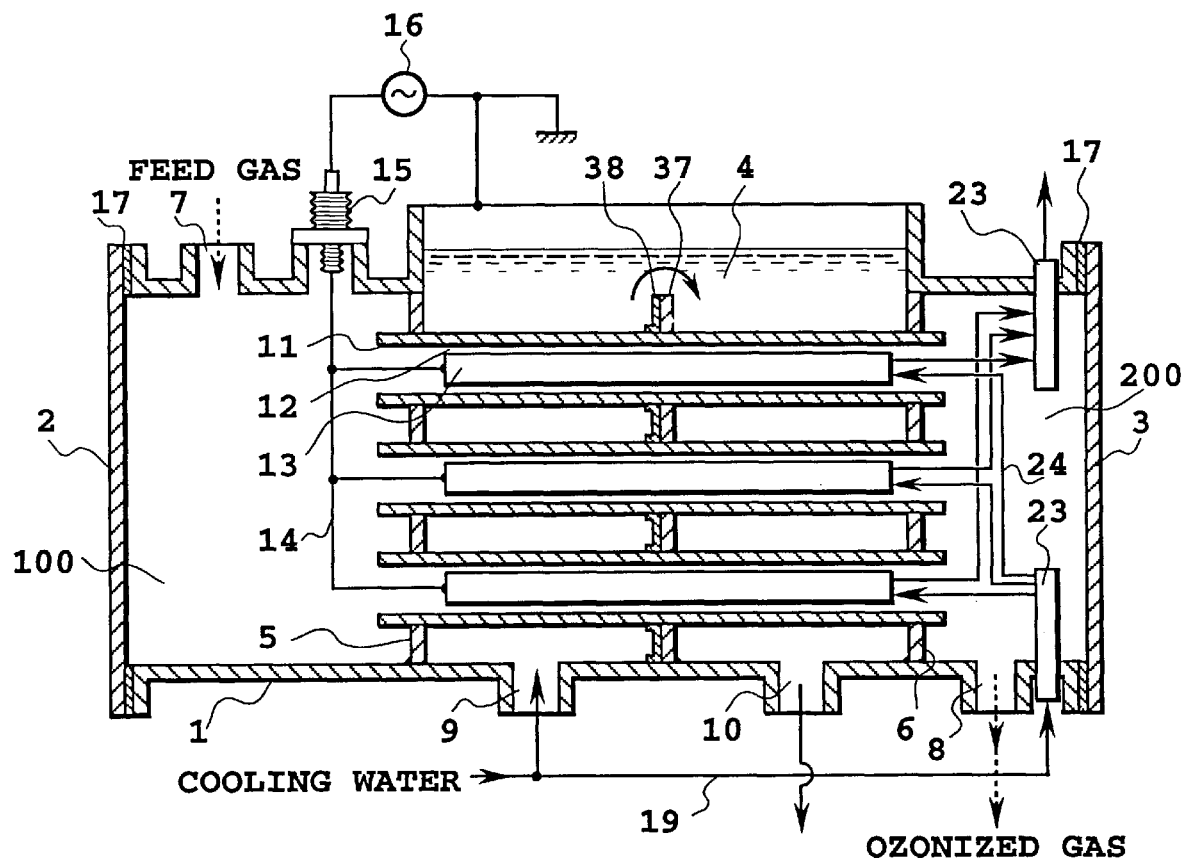
FIG. 8A is a longitudinal cross sectional view showing the entire ozone generator of another embodiment according to the present invention.
Figure 8B:
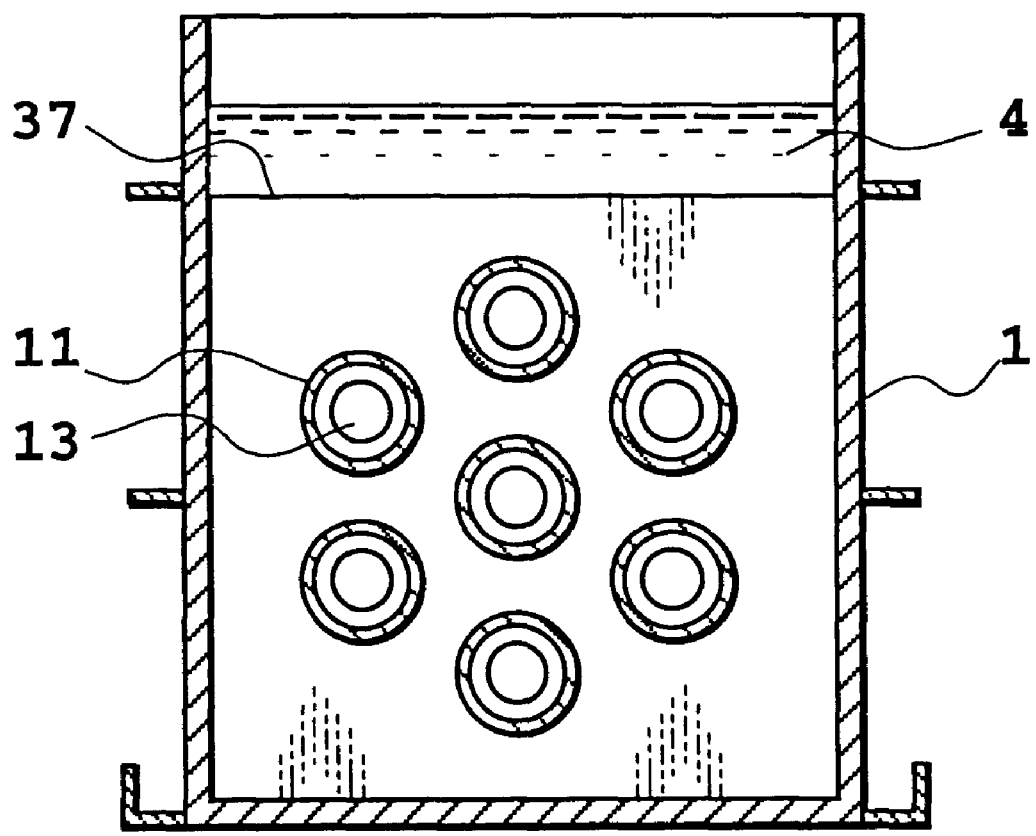
FIG. 8B is a transverse cross sectional view showing the body.

Next, another embodiment according to the present invention is shown in FIGS. 8A and 8B. Although the present embodiment is basically the same as the embodiment of FIG. 1, differs in layout of the feed gas inlet and the ozonized gas outlet and in construction of the water jacket.

That is, in the construction of FIG. 8, the feed gas inlet 7 is provided on the upper surface of the body 1 of the vessel, and the ozonized gas outlet 8 is reversely provided on the lower surface of the body 1. By this, a gas flow passage is formed so that the feed gas is introduced from the upper side of the feed gas chamber 100, and the ozonized gas flows out from the lower side of the ozonized gas chamber 200, thereby obtaining the following effect.

Specifically, when the feed gas is oxygen, for example, ozone is greater in specific gravity than oxygen. Therefore, as shown in FIG. 1 or FIG. 25, in the construction where the feed gas inlet is provided on the lower side of the chamber and the ozonized gas outlet is provided on the upper side, ozone tends to stay on the bottom side. When a number of ozone generating tubes are incorporated into the body, drift of gas flow occurs, and deviation tends to occur in gas flow rate and in ozone concentration in the individual ozone generating tubes. However, by forming the gas flow passage diagonally in the vessel so that the gas outlet 8 is on the lower side as described above, drift of the gas flow can be prevented and the feed gas is uniformly fed to the individual ozone generating tubes.

Further, in the embodiment shown in FIGS. 8A and 8B, to the water jacket 4 defined between the pair of right and left partition walls 5 and 6 in the body 1, an intermediate partition wall 37 is provided in the middle of the walls 5 and 6, and the cooling water inlet 9 and outlet 10 are distributed to both sides on the lower surface side of the body 1. This forms an inverse U-shaped cooling water passage in the water jacket 4 on both sides of the intermediate partition wall 37 between the cooling water inlet 9 and outlet 10. The lower end of the intermediate partition wall 37 is welded to the bottom of the body 1 and both side ends are welded to the side walls of the body 1. Still further, a flat packing 38 is provided on the wall surface facing the cooling water inlet side of the intermediate partition wall 37. By the flat packing 38, the hole of the intermediate partition wall 37 to which the ground electrode 11 penetrates is liquidtightly sealed. The flat packing 38 is provided in the penetrating portion of the ground electrode 11 with a hole having a diameter slightly smaller than the outer diameter of the electrode, and secured with bolts (not shown) to the intermediate partition wall 37.

When cooling water is supplied from the cooling water inlet 9 towards the water jacket 4 of the above construction, the cooling water flows upward in the water passage between the partition wall 5 and the intermediate partition wall 37, then U turns at the upper end of the intermediate partition wall 37 and flows down in the water passage between the intermediate partition wall 37 and the partition wall 6, and flows out from the cooling water outlet 10. As can be seen from this, moving distance of cooling water flowing in the water jacket 4 becomes about two times that of the construction of FIGS. 1 and 25. Even when the volumic amount of cooling water is the same, the flow rate becomes two times thereby improving the cooling efficiency with respect to the ground electrode 11.

Further, in the construction of the embodiment of FIG. 8, the upper surface of the water jacket 4 is open to the atmospheric side. This suppresses the water pressure applied to the body 1 of the vessel, and the pressure resistance in design required for the body 1 to this extent.

Figure 9A:
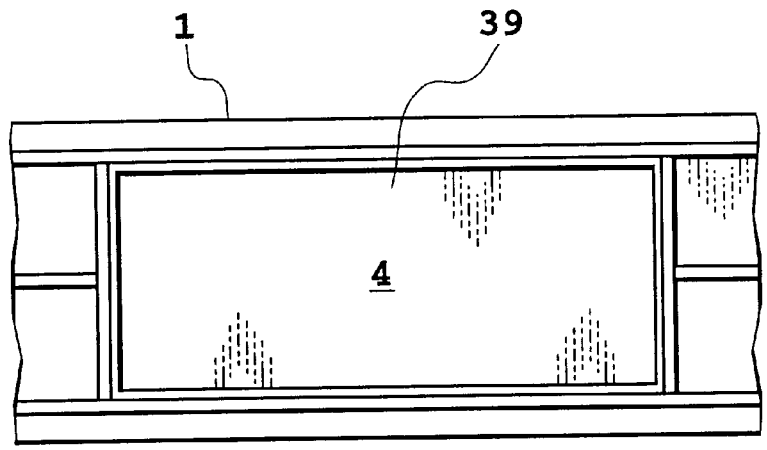
FIGS. 9A and 9B are a plan view and a cross sectional view showing another embodiment of a water jacket in FIG. 8A.
Figure 9B:
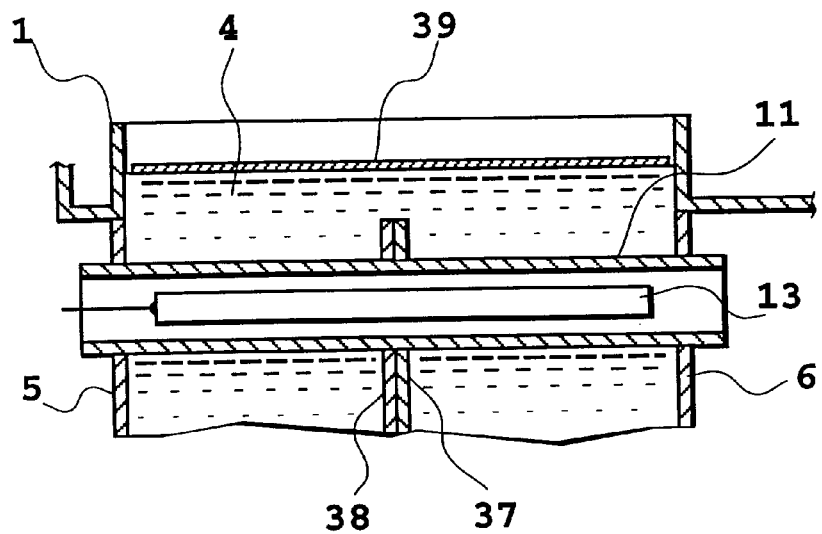

FIGS. 9A and 9B show an improved embodiment of the above atmosphere open type water jacket 4, in which a film seal 39 is provided on the liquid surface to cover the open surface of the water jacket 4. This film seal 39 eliminates direct contact of cooling water with the atmosphere to prevent dissolution of oxygen in the cooling water from the atmosphere. That is, when the oxygen concentration dissolved in the cooling water is increased, the metal ground electrode 11 is oxidized and corroded to decrease its service life. However, by covering the open surface of the water jacket 4 with the film seal 39, the expanded portion of cooling water due to temperature increase of cooling water is escaped to efficiently suppress dissolution of oxygen into the cooling water from the atmosphere without causing a water pressure increase.

Figure 10A:
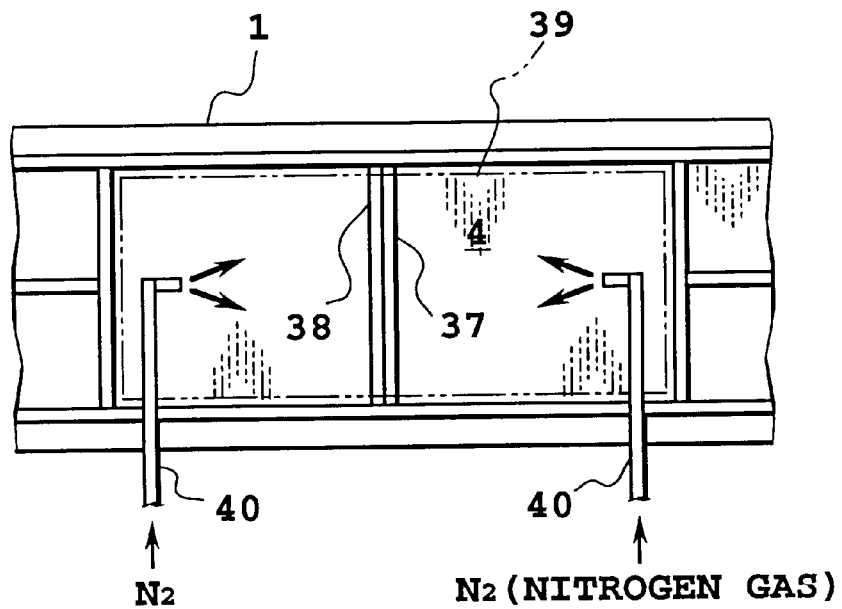
FIGS. 10A and 10B are a plan view and a cross sectional view showing a further embodiment of the water jacket.
Figure 10B:
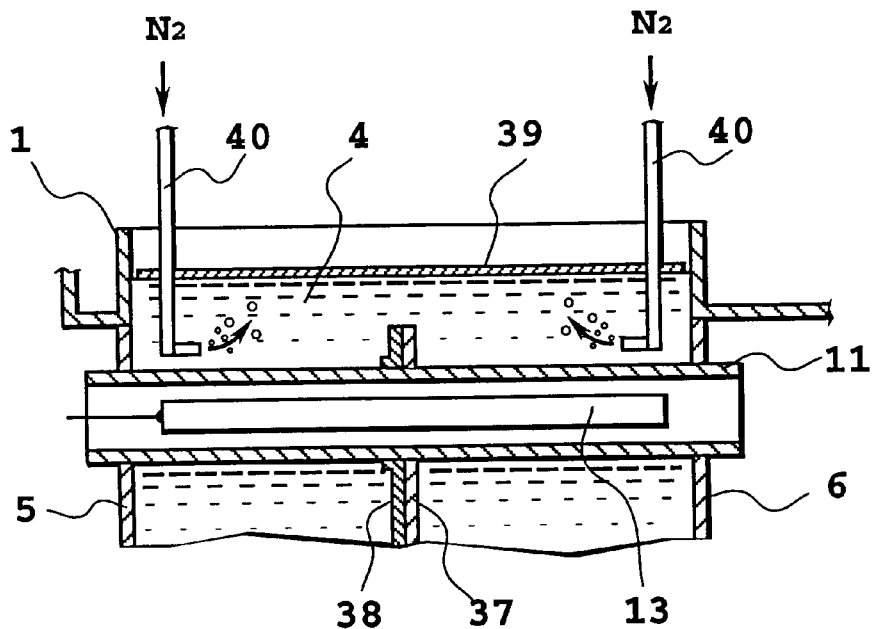

Further, FIGS. 10A and 10B show an improved embodiment in which, in addition to the construction in FIG. 9, nitrogen gas is bubbled from the outside into cooling water of the water jacket 4 to reduce the concentration of dissolved oxygen in the cooling water so that the ground electrode 11 is prevented from corrosion. In the present embodiment, a gas conduit 40 is provided which is open inside the water jacket 4 and connected to a nitrogen gas source, and nitrogen gas is bubbled in the cooling water filling in the water jacket through the gas conduit 40.

Figure 24:
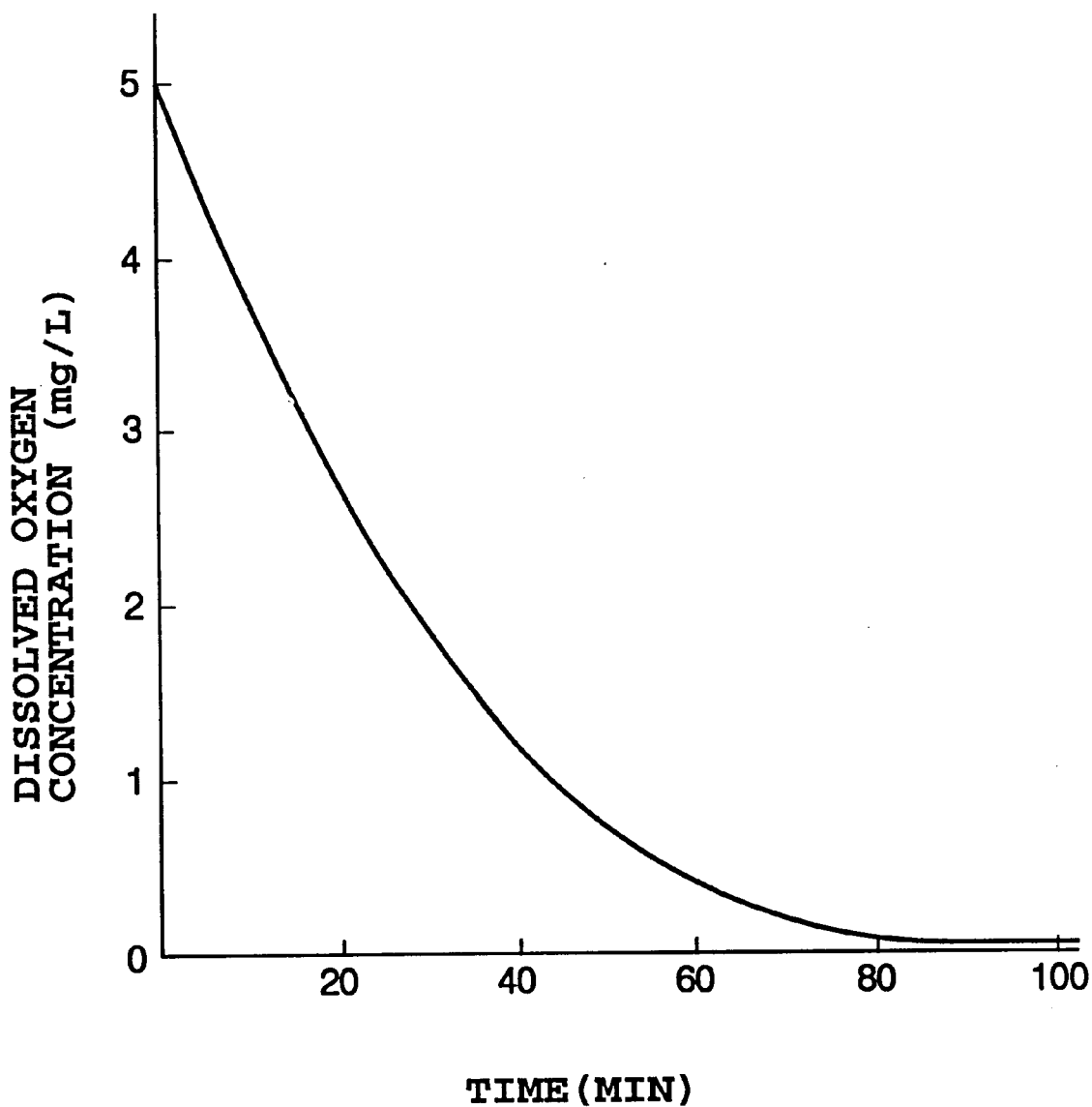
FIG. 24 is a characteristic diagram showing changes in dissolved oxygen concentration with the passage of time when nitrogen gas is bubbled into cooling water in the water jacket according to the present invention.

FIG. 24 is a diagram showing changes with the passage of time of dissolved oxygen concentration in cooling water according to test results of bubbling nitrogen gas into the water jacket 4. It has been confirmed that in an experiment conducted with a cooling water amount of 20 l and a nitrogen gas flow rate of 1 l/min, the initial value of cooling water dissolved oxygen concentration of 5 mg/l at the beginning of the experiment reduces with the passage of time after the beginning of nitrogen gas bubbling, reaching nearly 0 mg/l after 100 minutes.

Figure 11A:
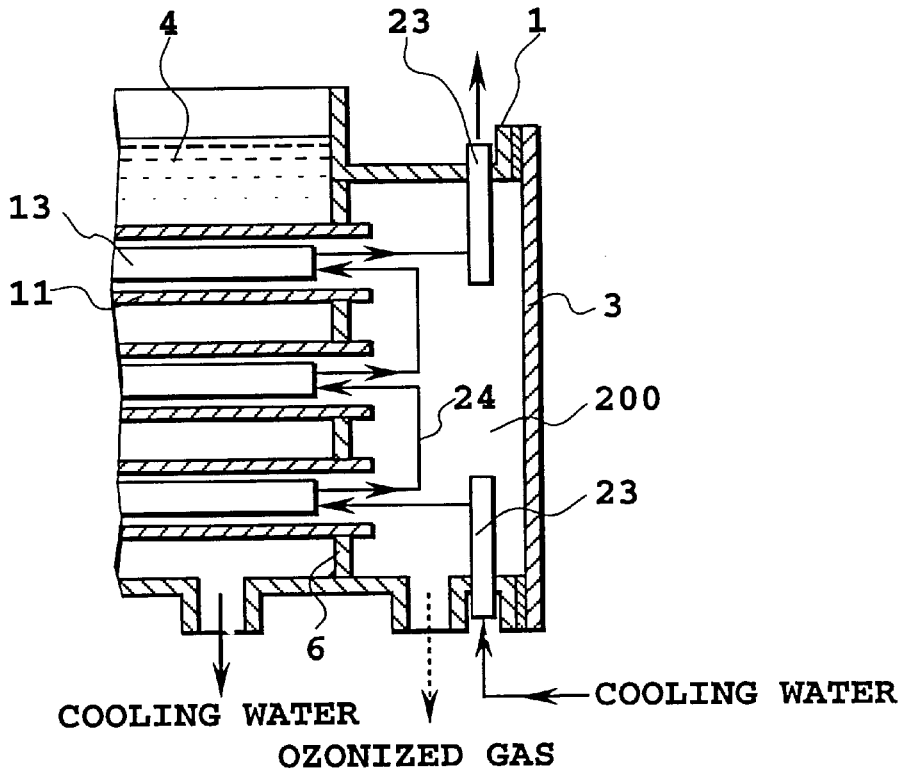
FIGS. 11A and 11B are a cross sectional view and a front view showing a cooling water supply system to the high voltage electrode.
Figure 11B:
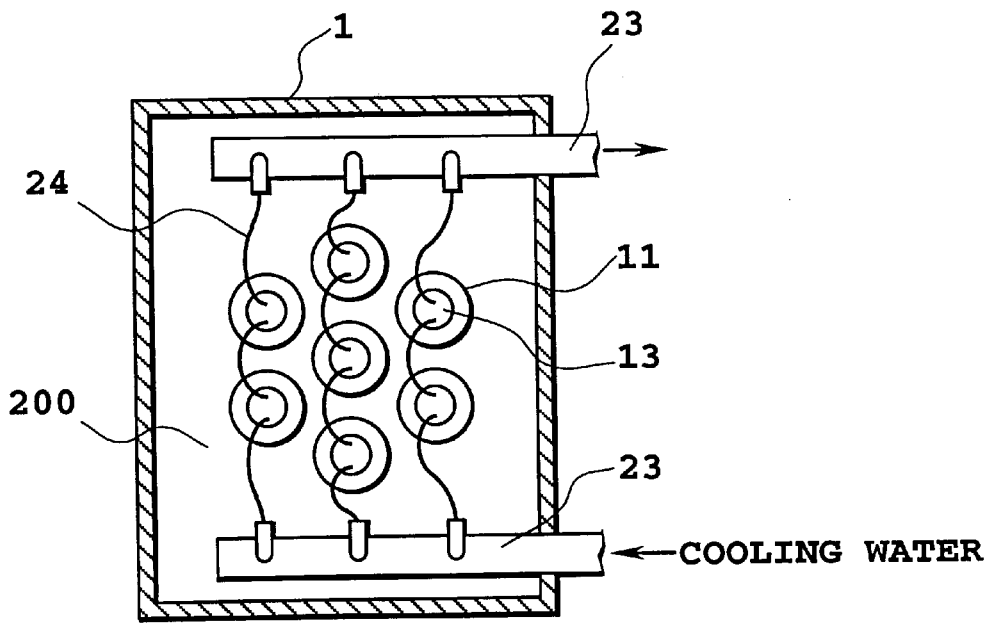

Next, in FIGS. 11A and 11B, an application embodiment is shown which is on a piping system for supplying cooling water to a plurality of high voltage electrodes 13 incorporated in the body 1 of the vessel. In the present embodiment, insulation tubes 24 connected in series between high voltage electrodes 13 within a group, each group comprising a plurality of the electrodes, are provided between inlet and outlet side cooling water distributors 23 disposed in the ozonized gas chamber 200. That is, in the actual product, several tens to several hundreds of high voltage electrodes are incorporated in the vessel, if an insulation tube 24 is independently connected to each electrode between the distributors, a large number of insulation tubes are required and the piping structure becomes complicated. On the other hand, as described above, when a plurality of the high voltage electrodes 13 in each group are provided with the insulation tubes 24 connecting them in series, the piping structure and piping work are remarkably simplified.

Figure 12:
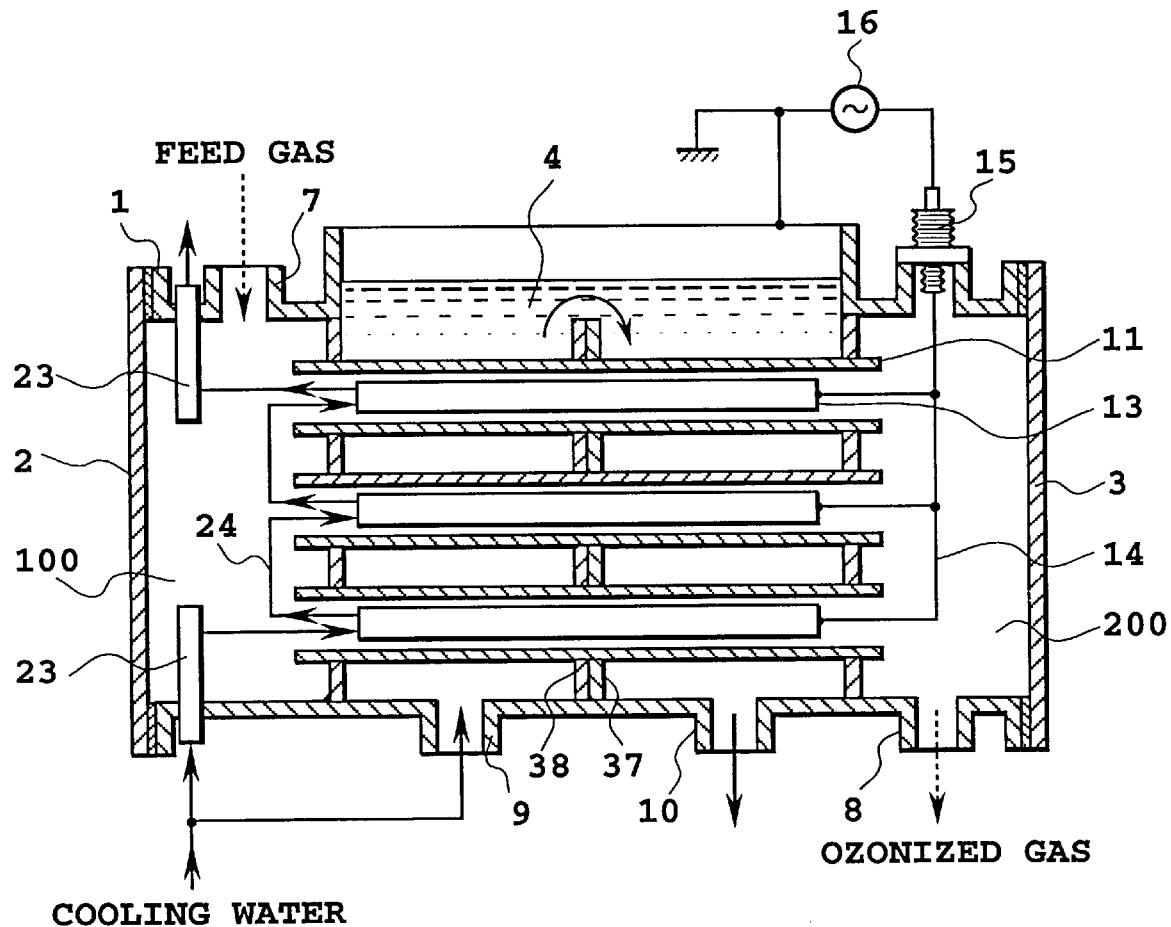
FIG. 12 is a longitudinal cross sectional view showing a yet further embodiment of the ozone generator according to the present invention.

FIG. 12 shows another application embodiment, in which the cooling water distributors 23 and the insulation tubes 24 for supplying cooling water to the high voltage electrodes are disposed in the feed gas chamber 100 in reverse to the embodiment shown in FIG. 11. By supplying cooling water from the feed gas inlet side to the high voltage electrodes 13, the insulation tube is not exposed to the ozonized gas and is not necessary to be considered for ozone resistance, and thus can be made of commonly available material such as nylon. In the present embodiment, in association with the above-described construction, the bushing 15 of the high voltage power supply circuit and the bus bar 14 are moved to the ozonized gas chamber 200 side.

Figure 13A:
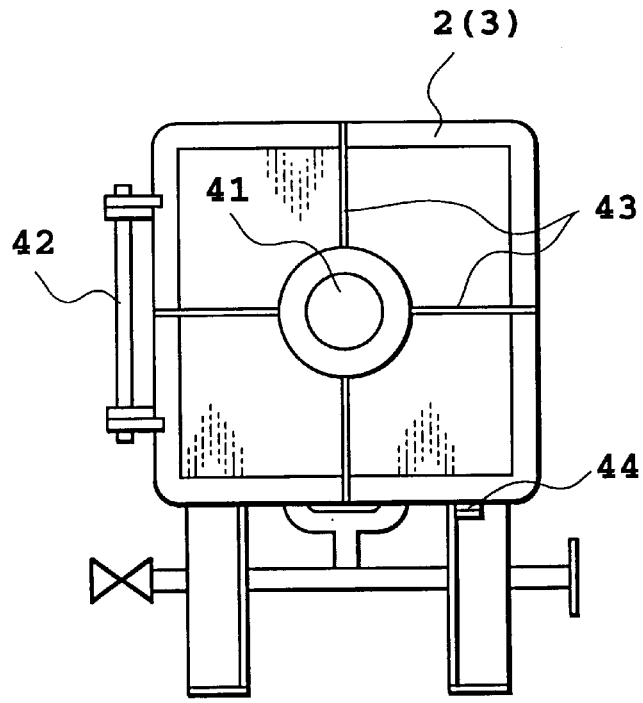
FIGS. 13A and 13B are a front view and a partial plan view showing an embodiment according to the present invention in which the end plate is formed as a door structure.
Figure 13B:
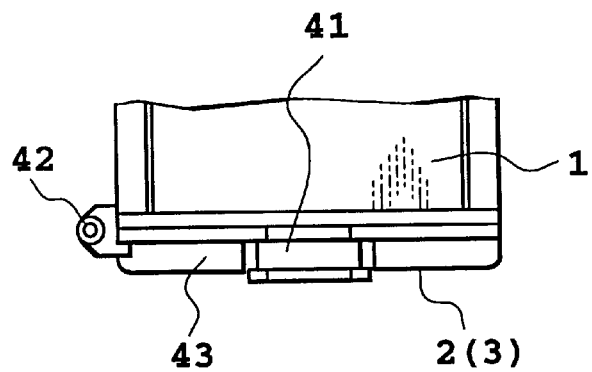

Next, an application embodiment according to the present invention with respect to the structure of the vessel is shown in FIGS. 13 and 14. First, the embodiment shown in FIGS. 13A and 13B is provided with view windows 41 for observing inside the body on end plates 2 and 3 disposed on the front and rear end of the body 1. By providing this view window 41, during the operation the discharge condition of the ozone generating tubes incorporated in the body and the like can be visually observed from the outside, and if an ozone generating tube is damaged, the damaged location can be specified from the outside. The position and size of the view window 41 is determined so that the entire ozone generating tubes incorporated in the body can be observed.

Further, in the present embodiment, the end plates 2 and 3 are formed in a door structure mounted to the body 1 through a hinge piece 42. Reference numeral 43 indicates a reinforcing rib of the door plate, and 44 is a support guide for supporting the end plates 2 and 3 at closed position from the lower side. With this construction, at the maintenance such as inspection, the heavy end plates 2 and 3 can be simply opened and closed without using a crane or the like. Still further, with the provision of the support guide 44, the bolt holes provided in the end plates 2 and 3 and the body 1 will not shift out of alignment when the door is closed.

Figure 14A:
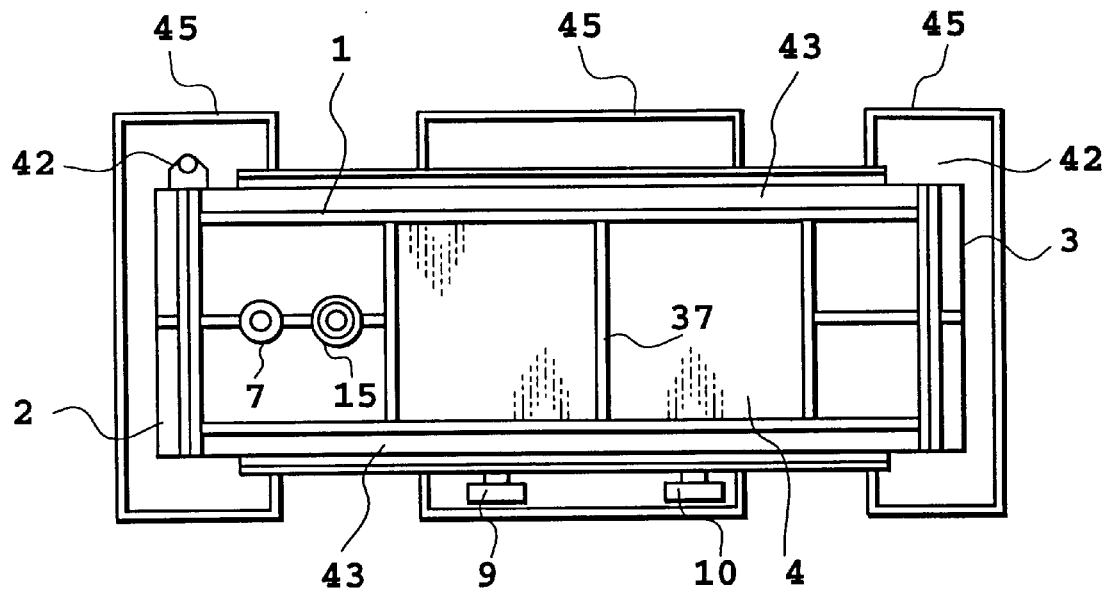
FIGS. 14A and 14B are a plan view and a side view showing an external appearance of the ozone generator according to the present invention.
Figure 14B:
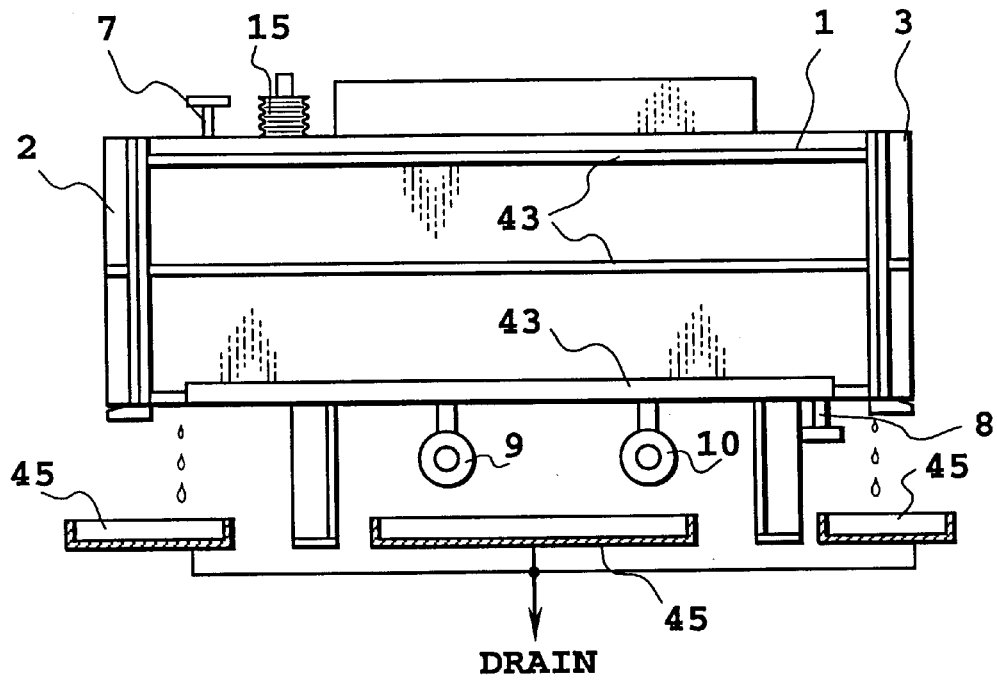

FIGS. 14A and 14B show the entire structure of the ozone generator, in which the door-structured end plates 2 and 3 as shown in FIG. 13 are disposed on both ends of the body 1, and the upper and lower surfaces of the body 1 are provided with the feed gas inlet 7, the ozonized gas outlet 8, the cooling water inlet 9 and outlet 10, the bushing 15 and the like. Further, on the outer peripheral surface of the body 1 is provided with the reinforcing ribs 43 which are the same as those described in FIG. 13 at appropriate positions. That is, gas pressure introduced into the vessel is, for example, 1.6 atm in absolute pressure, the vessel is required to have a thickness for withstanding the inner pressure, however, by providing the reinforcing ribs 43 as shown above, the thickness of the steel plate of the vessel can be reduced, thereby achieving a light weight and low-cost generator. Further, since the cooling water is recirculated in the body 1 during operation, when the cooling water temperature is low, dew condensation occurs on the side wall, the condensed water tends to drop onto the floor to wet the floor surface. Then, in the present embodiment, a drain pan 45 is disposed beneath the vessel to receive condensed water dropped from the outer surface of the vessel to discharge the water from the system through a drain pipe (not shown). Yet further, the drain pan 45 can be divided into three parts, both end parts and a central part, as shown, or can be integrally structured.

Figure 15:
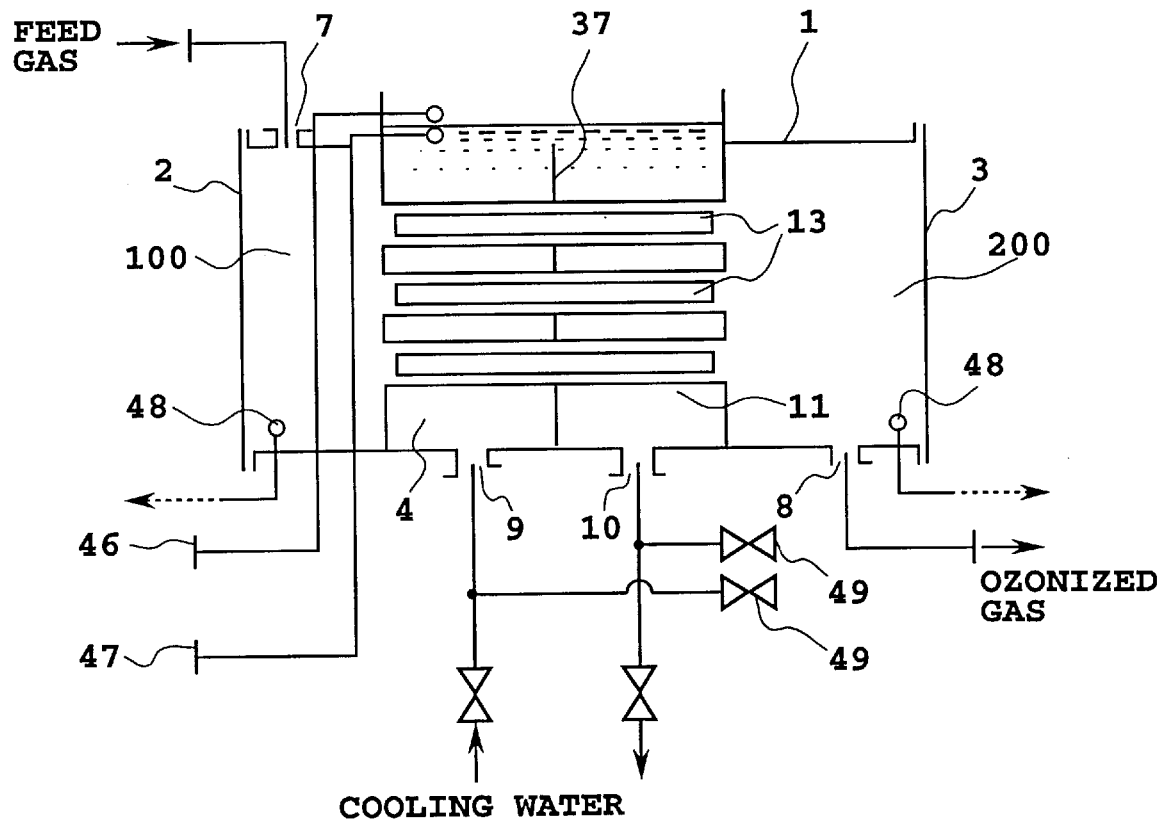
FIG. 15 is a flow circuit diagram schematically showing a gas and cooling water piping system in the ozone generator according to the present invention.

FIG. 15 is a schematic flow circuit showing the gas and cooling water piping systems provided in the ozone generator, in which, in addition to the basic gas and cooling water piping systems, the following elements are provided. That is, to the water jacket 4 with the upper surface open to the atmosphere, a water supply tube 46 which is open at the upper portion of the water jacket 4 for supplying cooling water after maintenance, and an overflow pipe 47 for discharging excess water from the water jacket 4 when supplying cooling water, are provided. Further, water leakage sensors 48 are disposed at the bottoms in the feed gas chamber 100 and the ozonized gas chamber 200. When cooling water leaks from the high voltage electrode or the ground electrode into the chamber, the water leakage sensor 48 detect the water leakage, gives an alarm, and stops the operation. This can prevent secondary accident such as a leakage of high voltage electricity. Further, the cooling water supply tube and the discharge tube are individually provided with drains 49 so that cooling water can be completely removed such as during maintenance.

Figure 16:
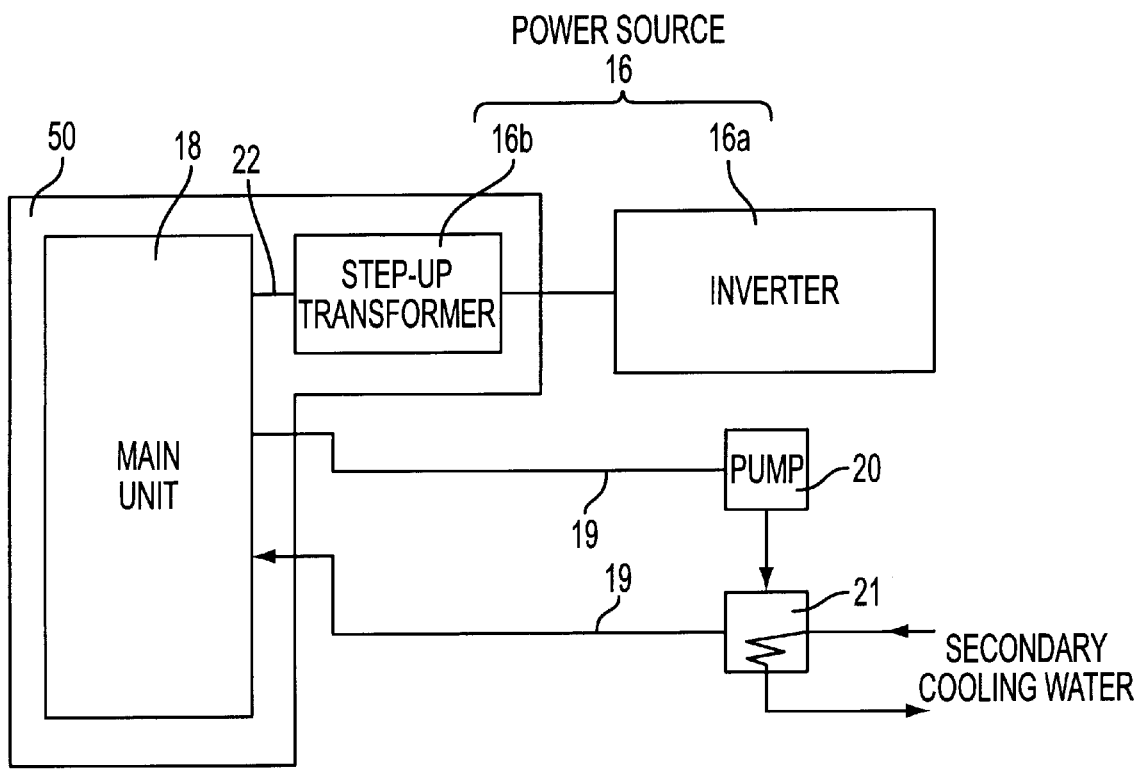
FIG. 16 is a layout diagram showing a layout example of the ozone generator according to the present invention.
Figure 17:
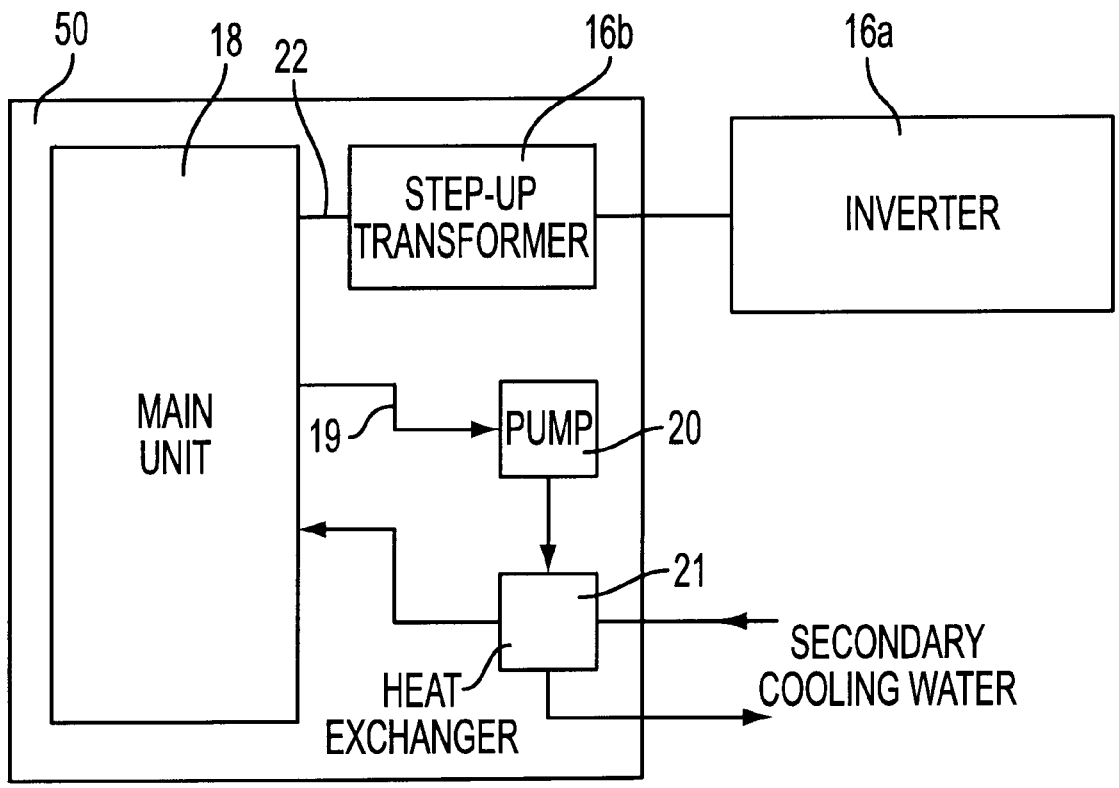
FIG. 17 is a layout diagram showing another layout example of the ozone generator according to the present invention.
Figure 18:
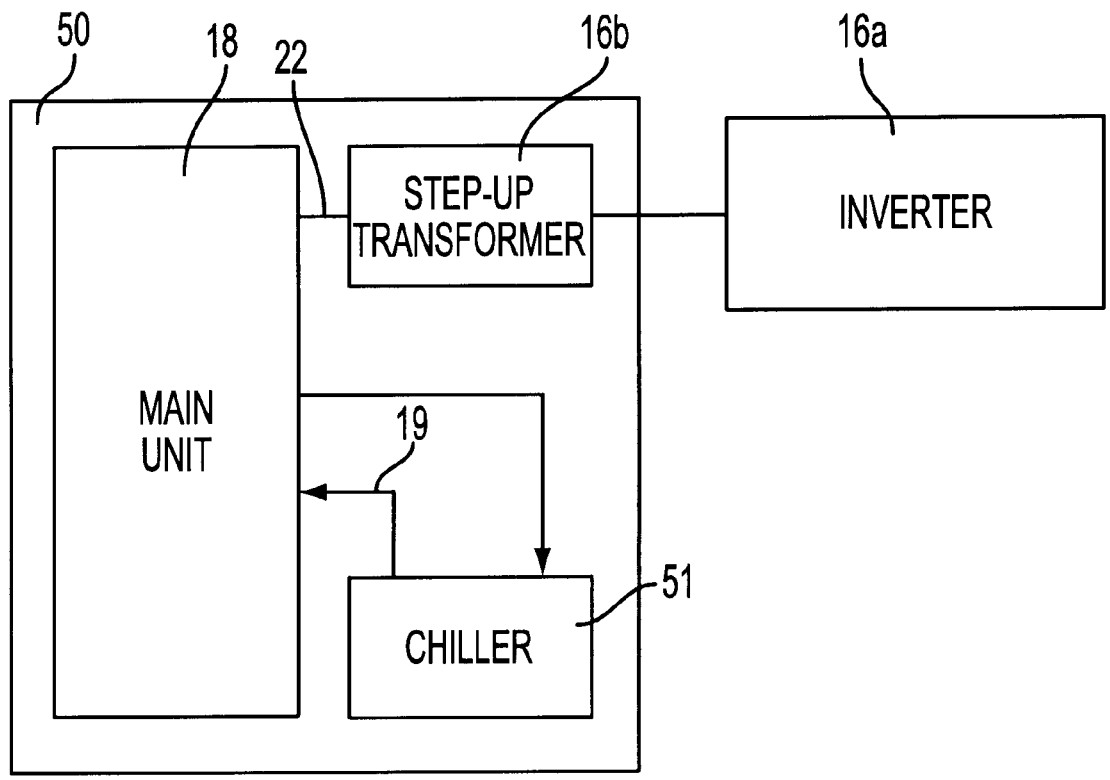
FIG. 18 is a layout diagram showing a yet further example of the ozone generator according to the present invention.
Figure 27:
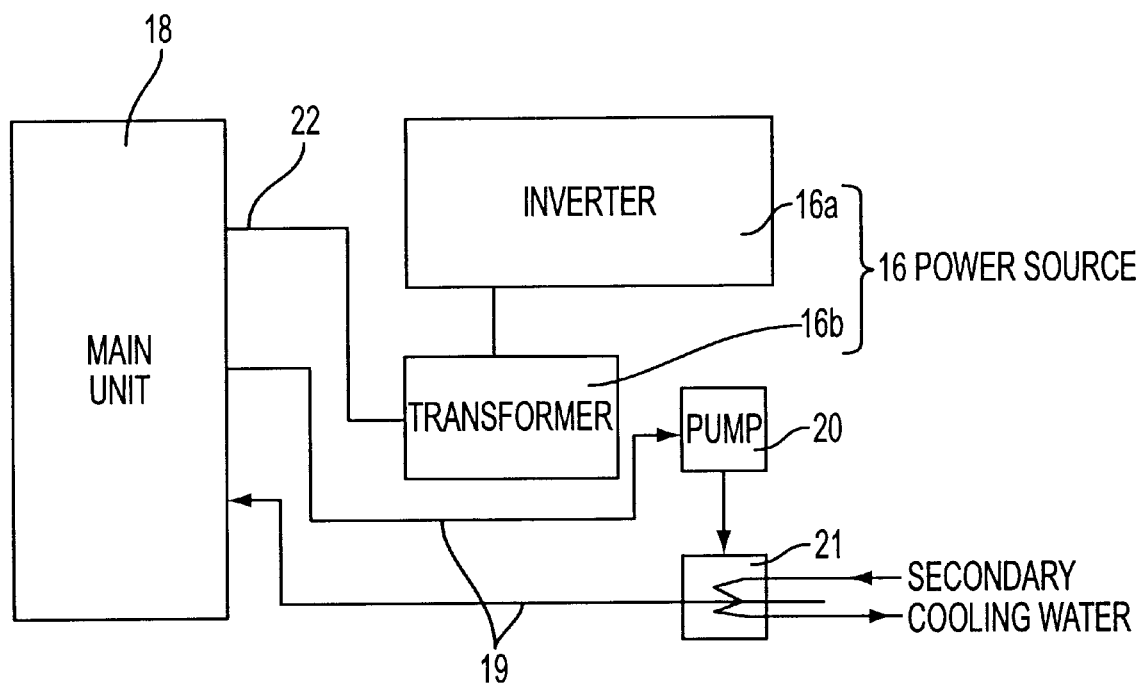
FIG. 27 is a schematic view showing a layout of a prior art ozone generator.

Next, some embodiments are shown in FIG. 16, FIG. 17 and FIG. 18 in which the main unit of the ozone generator is disposed together with the power sources and other peripheral devices there on a common pedestal to reduce the installation space. The individual embodiments will be described comparing with the prior art discrete layout system shown in FIG. 27. First, in the embodiment shown in FIG. 16, the vessel main unit 18 and a step-up transformer 16b of the power source 16 are disposed on a common pedestal 50, and an inverter 16a is disposed outside the pedestal 50 and connected to the step-up transformer 16b with a cable. Further, peripheral devices of cooling water system such as the recirculation pump 20, the heat exchanger 21, and the like are disposed outside the pedestal 50, and connected to the main unit 18 with cooling water piping 19. In the prior art layout shown in FIG. 27, a high voltage cable 22 is provided between the main unit 18 and the step-up transformer 16b which is discretely disposed at a position separate from the main unit, however, in the layout shown in FIG. 16, the step-up transformer 16b and the main unit 18 can be directly connected on the pedestal 50, noise and danger of an electric shock are eliminated.

Still further, in the embodiment shown in FIG. 17, the vessel main unit 18 of the ozone generator, the step-up transformer 16b, the cooling water recirculation pump 20, and the heat exchanger 21 are disposed on the common pedestal 50, the main unit 18 and the recirculation pump 20 and the heat exchanger 21 are connected with each other with the cooling water piping 19 on the common pedestal. This decreases the piping length of the cooling water piping 19 to reduce heat loss.

Yet further, in the embodiment shown in FIG. 18, a chiller (a refrigerator for water cooling) 51 is used instead of the recirculation pump 20 and the heat exchanger 21 in FIGS. 16 and 17, which is disposed on the common pedestal 50.

As described above, by integrating the ozone generator into a unit using the common pedestal 50, compact apparatus and a considerable space saving can be achieved in addition to the above various effects as compared with the prior art construction in which main devices are discretely disposed.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ozone generator comprising:
   a vessel having a feed gas chamber, at one end, for receiving a feed gas through an inlet of the vessel and, at the other end, an ozonized gas chamber for receiving an ozonized gas, said ozonized gas chamber communicating with an outlet of the vessel to release said received ozonized gas;
   a cylindrical tube ground electrode having a metal tube and a dielectric layer welded on an inner peripheral surface of the metal tube for communicating said feed gas chamber with said ozonized chamber;
   a hollow cylindrical high voltage electrode having a predetermined discharge gap with respect to said dielectric and disposed concentrically within said cylindrical tube ground electrode;
   a high frequency power source for applying a voltage between said ground electrode and said high voltage electrode; and
   cooling water supply means for supplying cooling water to a water jacket surrounding said ground electrode and to said hollow cylindrical high voltage electrode, said cooling water supply means being formed within said vessel;
   wherein said cylindrical tube ground electrode and said hollow cylindrical high voltage electrode define an ozone generating tube and said ozone generator comprises a plurality of said ozone generating tubes.

2. The ozone generator as claimed in claim 1, wherein the cooling water is pure water having a specific resistivity value of equal to or higher than 200 kΩcm.

3. The ozone generator as claimed in claim 1, wherein a flow rate of the cooling water flowing in said hollow cylindrical high voltage electrode is set equal to or more than 20 cm/sec.

4. The ozone generator as claimed in claim 1, further comprising electrode holding means for holding said high voltage electrode at a predetermined position inside said ground electrode to maintain said predetermined gap.

5. The ozone generator as claimed in claim 4, wherein said electrode holding means has protrusions dispersingly formed on the outer peripheral surface of said high voltage electrode.

6. The ozone generator as claimed in claim 4, further comprising a stopper piece made of an insulator material disposed on a gas outlet side of said high voltage electrode and secured to said ground electrode for positioning said high voltage electrode in an axial direction.

7. The ozone generator as claimed in claim 4, said electrode holding means comprises spring bodies disposed dispersingly in a peripheral direction on the outer peripheral surface of said high voltage electrode.

8. The ozone generator as claimed in claim 1, wherein said high voltage electrode is made of an ozone-resistant metal material and has a thickness of equal to or less than 2 mm.

9. The ozone generator as claimed in claim 1, wherein said high voltage electrode is coated with chromium oxide on the surface.

10. The ozone generator as claimed in claim 1, wherein said metal tube of said cylindrical tube ground electrode is made of ozone-resistant metal material and the entire inner peripheral surface of said metal tube is lined with glass as a dielectric.

11. The ozone generator as claimed in claim 1, wherein each of said high voltage electrodes is connected through an overcurrent protection fuse with a bus bar of said high frequency power source leading into said vessel.

12. The ozone generator as claimed in claim 1, wherein said vessel and peripheral devices thereof are disposed on a common pedestal as a single unit.

13. An ozone generator comprising:
    a vessel having a feed gas chamber, at one end, for receiving a feed gas through an inlet of the vessel and, at the other end, an ozonized gas chamber for receiving an ozonized gas, said ozonized gas chamber communicating with an outlet of the vessel to release said received ozonized gas;

a cylindrical tube ground electrode having a metal tube and a dielectric layer welded on an inner peripheral surface of the metal tube for communicating said feed gas chamber with said ozonized chamber;

a hollow cylindrical high voltage electrode having a predetermined discharge gap with respect to said dielectric and disposed concentrically within said cylindrical tube ground electrode;

a high frequency power source for applying a voltage between said ground electrode and said high voltage electrode; and cooling water supply means for supplying cooling water to a water jacket surrounding said ground electrode and to said hollow cylindrical high voltage electrode, said cooling water supply means being formed within said vessel;

wherein said cylindrical tube ground electrode and said hollow cylindrical high voltage electrode define an ozone generating tube and said ozone generator comprises a plurality of said ozone generating tubes, and wherein said hollow cylindrical high voltage electrode has bending precision per 1 m of electrode length set equal to or less than 0.2 mm and circularity set equal to or less than ±0.1 mm, said cylindrical tube ground electrode has bending precision per 1 m of electrode length set equal to or less than 0.3 mm and circularity set equal to or less than ±0.3 mm, and said discharge gap between said dielectric on the inner peripheral surface of said ground electrode and said high voltage electrode is set to less than 1 mm over the entire length of said electrode.

14. An ozone generator comprising:

a vessel having a feed gas chamber, at one end, for receiving a feed gas through an inlet of the vessel and, at the other end, an ozonized gas chamber for receiving an ozonized gas, said ozonized gas chamber communicating with an outlet of the vessel to release said received ozonized gas;

a cylindrical tube ground electrode having a metal tube and a dielectric lined on an inner peripheral surface of the metal tube for communicating said feed gas chamber with said ozonized chamber;

a hollow cylindrical high voltage electrode having a predetermined discharge gap with respect to said dielectric and disposed concentrically within said cylindrical tube ground electrode;

a high frequency power source for applying a voltage between said ground electrode and said high voltage electrode; and cooling water supply means for supplying cooling water to a water jacket surrounding said ground electrode and to said hollow cylindrical high voltage electrode, said cooling water supply means being formed within said vessel;

wherein said cylindrical tube ground electrode and said hollow cylindrical high voltage electrode define an ozone generating tube, said ozone generator comprising a plurality of said ozone generating tubes, and wherein said vessel is a horizontal type vessel comprising a rectangular-sectional body, end plates for closing front and rear ends thereof through airtight members, and a pair of partition walls for defining said feed gas chamber, said ozonized gas chamber, and said water jacket in said body, said ground electrode is detachably disposed between the pair of partition walls so as to liquid-tightly penetrate said partition walls, and said inlet, said outlet, and cooling water inlet and outlet for said water jacket are provided on the peripheral surface of said body.

15. The ozone generator as claimed in claim 14, wherein said ozonized gas chamber has a depth of equal to or less than 30 cm.

16. The ozone generator as claimed in claim 14, wherein said feed gas inlet is provided on the upper side of said body, and said outlet is provided on the lower side of said body.

17. The ozone generator as claimed in claim 14, wherein a part where said ground electrode penetrates said partition walls is provided with a sealing member and a holding member for holding said sealing member and said ground electrode.

18. The ozone generator as claimed in claim 17, further comprising a conductive coil spring wound around the peripheral surface of said ground electrode, said coil spring together with said electrode holding member being retained with bolts on said partition walls.

19. The ozone generator as claimed in claim 14, further comprising a partition plate approximately at the center of said water jacket to form a U-shaped cooling water passage, and wherein cooling water inlet and outlet are provided on the lower surface of said body which communicate with said cooling water passage.

20. The ozone generator as claimed in claim 14, wherein an upper part of said water jacket is open to the atmosphere, and a cooling water supply tube and an overflow outlet tube are provided at the upper part of said water jacket.

21. The ozone generator as claimed in claim 20, further comprising a nitrogen gas bubbling tube provided for bubbling nitrogen gas from the outside in cooling water in said water jacket.

22. The ozone generator as claimed in claim 20, further comprising a film seal provided on the surface of cooling water contained in said water jacket for preventing the cooling water from directly contacting with the atmosphere.

23. The ozone generator as claimed in claim 14, further comprising a water leakage sensor disposed at the bottom of said gas chambers.

24. The ozone generator as claimed in claim 14, further comprising a cooling water distributor disposed in said feed gas chamber or said ozonized gas chamber, and an ozone-resistant insulation tube provided between said distributor and said high voltage electrode.

25. The ozone generator as claimed in claim 14, wherein at least one of said end plates is provided with a view window for observing inside said body.

26. The ozone generator as claimed in claim 14, wherein at least one of said end plates is hinged with an end of said body as a door.

* * * * *